(12) United States Patent
Kurashige et al.

(10) Patent No.: US 10,955,736 B2
(45) Date of Patent: *Mar. 23, 2021

(54) SCREEN, DISPLAY APPARATUS, SCREEN USE METHOD, PARTICLE, PARTICLE LAYER, PARTICLE SHEET, AND LIGHT CONTROL SHEET

(71) Applicant: Dai Nippon Printing Co., Ltd., Tokyo (JP)

(72) Inventors: Makio Kurashige, Tokyo (JP); Kaori Nakatsugawa, Tokyo (JP); Kazutoshi Ishida, Tokyo (JP); Hiroyuki Honda, Tokyo (JP); Masanori Umeya, Tokyo (JP); Shogo Kubota, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/828,246

(22) Filed: Mar. 24, 2020

(65) Prior Publication Data

US 2020/0225569 A1     Jul. 16, 2020

Related U.S. Application Data

(63) Continuation of application No. 15/568,520, filed as application No. PCT/JP2016/062814 on Apr. 22, 2016, now Pat. No. 10,634,986.

(30) Foreign Application Priority Data

Apr. 22, 2015  (JP) .............................. JP2015-087773
Apr. 22, 2015  (JP) .............................. JP2015-087776
(Continued)

(51) Int. Cl.
*G03B 21/60*     (2014.01)
*G02B 5/02*      (2006.01)
(Continued)

(52) U.S. Cl.
CPC ............. *G03B 21/60* (2013.01); *G02B 5/003* (2013.01); *G02B 5/02* (2013.01); *G02B 27/48* (2013.01); *G03B 21/567* (2013.01)

(58) Field of Classification Search
CPC .............................. G03B 21/562; G03B 21/60
(Continued)

(56) References Cited

U.S. PATENT DOCUMENTS 5,262,098 A    11/1993   Crowley et al.
5,708,525 A     1/1998   Sheridon
(Continued)

FOREIGN PATENT DOCUMENTS

CN          1207193 A      2/1999
CN        102402113 A      4/2012
(Continued)

OTHER PUBLICATIONS

International Search Report and Written Opinion (Application No. PCT/JP2016/062814) dated Jul. 5, 2016.
(Continued)

*Primary Examiner* — Christopher E Mahoney
(74) *Attorney, Agent, or Firm* — Burr & Brown, PLLC

(57) ABSTRACT

There is provided a screen capable of sufficiently reducing speckles. A screen for displaying an image by being irradiated with a light beam from a projector, is provided with a plurality of particles each including a first part and a second part different in dielectric constant, a particle layer having the plurality of particles, and electrodes which form an electric field for driving the particles of the particle layer by applying a voltage to the particle layer.

8 Claims, 22 Drawing Sheets

(30) Foreign Application Priority Data

| Apr. 30, 2015 | (JP) | JP2015-093064 |
|---|---|---|
| May 18, 2015 | (JP) | JP2015-101248 |
| May 18, 2015 | (JP) | JP2015-101250 |
| Jun. 1, 2015 | (JP) | JP2015-111489 |
| Jun. 1, 2015 | (JP) | JP2015-111499 |
| Nov. 12, 2015 | (JP) | JP2015-222167 |

(51) Int. Cl.
*G02B 5/00* (2006.01)
*G02B 27/48* (2006.01)
*G03B 21/56* (2006.01)

(58) Field of Classification Search
USPC .......................................................... 359/446
See application file for complete search history.

(56) References Cited

U.S. PATENT DOCUMENTS

| 6,092,900 | A | 7/2000 | Diedrich et al. |
|---|---|---|---|
| 6,120,588 | A | 9/2000 | Jacobson |
| 7,614,750 | B2 | 11/2009 | May et al. |
| 10,634,986 | B2 * | 4/2020 | Kurashige ............ G03B 21/567 |
| 2001/0046081 | A1 | 11/2001 | Hayashi et al. |
| 2006/0014894 | A1 | 1/2006 | Torii et al. |
| 2007/0058135 | A1 | 3/2007 | Morikawa et al. |
| 2010/0244011 | A1 | 9/2010 | Moriya |
| 2012/0224109 | A1 | 9/2012 | Okagaki et al. |
| 2012/0275014 | A1 | 11/2012 | Ogawa et al. |
| 2013/0170007 | A1 | 7/2013 | Kurashige et al. |
| 2015/0009569 | A1 | 1/2015 | Okagaki et al. |
| 2017/0031172 | A1 | 2/2017 | Lofftus et al. |

FOREIGN PATENT DOCUMENTS

| CN | 102652272 | A | 8/2012 |
|---|---|---|---|
| JP | S56-067887 | A1 | 6/1981 |
| JP | S64-028259 | A1 | 1/1989 |
| JP | H06-226875 | A1 | 8/1994 |
| JP | 2780723 | B2 | 7/1998 |
| JP | H10-293329 | A1 | 11/1998 |
| JP | H1-218726 | A1 | 8/1999 |
| JP | 2000-104464 | A1 | 4/2000 |
| JP | 2002-504236 | A1 | 2/2002 |
| JP | 2002-162652 | A1 | 6/2002 |
| JP | 2003-140204 | A1 | 5/2003 |
| JP | 2004-093602 | A1 | 3/2004 |
| JP | 2004-197083 | A1 | 7/2004 |
| JP | 2005-009158 | A1 | 1/2005 |
| JP | 2007-163926 | A1 | 6/2007 |
| JP | 2008-250068 | A1 | 10/2008 |
| JP | 2008-310260 | A1 | 12/2008 |
| JP | 2011-112792 | A1 | 6/2011 |
| JP | 2012-073357 | A1 | 4/2012 |
| JP | 5463911 | B2 | 4/2014 |
| JP | 2014/106510 | A1 | 6/2014 |
| WO | 97/33267 | A2 | 9/1997 |
| WO | 2011/070777 | A1 | 6/2011 |
| WO | 2012/033174 | A1 | 3/2012 |
| WO | 2013/128883 | A1 | 9/2013 |
| WO | 2016/171266 | A1 | 10/2016 |

OTHER PUBLICATIONS

Japanese Office Action (Application No. 2017-514220) dated Jun. 6, 2017 (with English translation).
English translation of International Preliminary Report on Patentability (Chapter I) (Application No. PCT/JP 2016/062814) dated Nov. 2, 2017.
Extended European Search Report (Application No. 16783287.2) dated Oct. 24, 2018.
Chinese Office Action (Application No. 201680022872.5) dated Dec. 27, 2019 (with English translation).
Australian Office Action, Australian Application No. 2016252693, dated Jul. 8, 2020 (4 pages).
Japanese Office Action (with English translation), Japanese Application No. 2020-024657, dated Feb. 9, 2021 (14 pages).

* cited by examiner

SCREEN, DISPLAY APPARATUS, SCREEN USE METHOD, PARTICLE, PARTICLE LAYER, PARTICLE SHEET, AND LIGHT CONTROL SHEET

CROSS REFERENCE TO RELATED APPLICATIONS

This application is a continuation of U.S. application Ser. No. 15/568,520, filed Oct. 23 2017, which in turn is the National Stage entry of International Application No. PCT/JP2016/062814, filed Apr. 22, 2016, which designated the United States, the entireties of which are incorporated herein by reference.

FIELD OF THE INVENTION

The present disclosure is related to a screen for displaying an image, a display apparatus having the screen, a screen use method, a particle, a particle layer, a particle sheet, and a light control sheet.

BACKGROUND OF THE INVENTION

As disclosed in, for example, an International Publication 2012/033174 pamphlet and Japanese Patent Laid-Open Publication Number 2008-310260, a projector using a coherent light source is widely used. As a coherent light beam, typically, a laser light beam oscillated by a laser light source is used. When a coherent light beam is used as an image light beam from the projector, speckles are observed on screen irradiated with the image light beam. The speckles are perceived as a spotted pattern to degrade displayed image quality. In the International Publication 2012/033174 pamphlet, for the purpose of reducing the speckles, the incidence angle of an image light beam incident on respective positions on a screen varies with time. As a result, scattering patterns having no correlation are overlapped on the screen to reduce the speckles.

SUMMARY OF THE INVENTION

As another method of reducing the speckles, a screen having diffusion characteristics that change with time is also considered to be effective. In this respect, Japanese Patent Laid-Open Publication Number 2008-310260 proposes a screen configured with an electronic paper. In the screen of Japanese Patent Laid-Open Publication Number 2008-310260, reflectance varies depending on the radiation position of an image light beam radiated in a raster scanning mode.

By changing the screen diffusion characteristics with time, speckle reduction is achieved using a regular projector. It can be said that this is very useful concerning that the speckles can be reduced in combination with a projector, such as a raster-scanning projector, which cannot adopt the method in the International Publication 2012/033174 pamphlet.

However, the projector disclosed in Japanese Patent Laid-Open Publication Number 2008-310260 has a problem in that its durability is not enough and upsizing is difficult. As a result, the screen has not been widely used as a screen having a speckle reduction function. The present disclosure is made in consideration of the above points and its purpose is to provide a screen capable of sufficiently reducing speckles with a method different from the conventional methods.

According to an aspect of the present disclosure, there is provided a screen which displays an image by being irradiated with a light beam from a projector, including:
a plurality of particles including a first part and a second part;
a particle layer having the plurality of particles; and
electrodes which form an electric field driving the plurality of particles of the particle layer by applying a voltage to the particle layer.

Dielectric constants of the first part and the second part of the particles may be different from each other.

The particles may have a monochrome color.

Either of the first part or the second part of the particles may be transparent.

A volume ratio of the first part of the particles may be larger than a volume ratio of the second part of the particles.

The first part of the particles may have a light diffusing function and the second part of the particles may have a light absorbing function.

The first part and the second part may be in contact with each other at an interface of a curved shape,
wherein the first part may be transparent, and
the particle layer may rotate the first part and the second part for at least part of the plurality of particles by an alternating current voltage applied between the electrodes.

The first part may be disposed closer than the second part to an observer of the screen.

The particle layer may rotate the first part and the second part within a rotation angle range less than 180 degrees in accordance with a frequency of the alternating current voltage applied between the electrodes.

Volumes of the first part and the second part may be different from each other.

The first part may be larger than the second part in volume,
wherein a surface of the second part, the surface being in contact with the interface, may have a concave shape.

The first part may be smaller than the second part in volume,
wherein a surface of the second part, the surface being in contact with the interface, may have a convex shape.

The second part may have a light diffusing function or a light absorbing function.

The second part may be a sphere or an oval sphere.

The projector may emit a coherent light beam,
wherein the particles may be configured to have higher reflectance to a light beam in a wavelength range of the coherent light beam than to a light beam outside the wavelength range of the coherent light beam.

The projector may emit a coherent light beam,
wherein the particles may be configured to have higher transmittance to a light beam in a wavelength range of the coherent light beam than to a light beam outside the wavelength range of the coherent light beam.

There may further be provided an absorbing layer to absorb the light beam outside the wavelength range of the coherent light beam.

The particles may include a pigment to selectively scatter the light beam in the wavelength range of the coherent light beam.

The particles may include a pigment or a dye to absorb the light beam outside the wavelength range of the coherent light beam.

At least one layer included in the screen may include a pigment or a dye to absorb the light beam outside the wavelength range of the coherent light beam.

There may be included a third part in surface contact with the first part and with the second part, the third part controlling an incident light from the first part, wherein the first part and the second part may be transparent, and the particle layer may rotate the first to third parts for at least part of the plurality of particles by an alternating current voltage applied between the electrodes.

The particle layer may rotate the first to third parts for at least part of the plurality of particles within a rotation angle range less than 180 degrees in accordance with a frequency of the alternating current voltage applied between the electrodes.

The third part may scatter or reflect an incident light from the first part.

A thickness between the first face of and the second face of the third part may be thinner than a maximum thickness of the first face of the first part in a direction of normal to the first face of the first part, and a thickness between the first face of and the second face of the third part may be thinner than a maximum thickness of the second face of the third part in a direction of normal to the second face of the third part.

The third part may be lower than the first part and the second part in visible light transmittance.

The first face and the second face may have a circular shape or an oval shape and the third part may be a disc, an oval disc, a cylinder or an elliptic cylinder.

There may be provided a screen which displays an image by being irradiated with a light beam from the projector, wherein at least part of the plurality of particles includes a plurality of diffused components dispersed in the first part and the second part.

There may be provided a Fresnel lens layer disposed on a surface side of the particle layer, the light beam being incident on the surface side.

There may be provided a screen which displays an image by being irradiated with a light beam from a projector, including:

a plurality of particles each having a first part and a second part;

a particle layer having the plurality of particles; and electrodes to form an electric field for driving the plurality of particles of the particle layer by applying a voltage to the particle layer, wherein the particles are rotatable by the electric field.

There may be provided a screen which displays an image by being irradiated with a light beam from a projector, including:

a particle layer having a plurality of particles and a holder to hold the particles, the particles being accommodated in cavities owned by the holder; and electrodes to form an electric field for driving the plurality of particles of the particle layer by applying a voltage to the particle layer, wherein a single particle among the particles is accommodated in a single cavity among the cavities.

There may be provided a photoelectric conversion panel-equipped screen including:

the above-described screen; and a photoelectric conversion panel disposed on an opposite side of the screen to a display-side surface of the screen, the photoelectric conversion panel being irradiated with the light beam passing through the screen.

There may be provided a photoelectric conversion panel-equipped screen including:

the above-described screen; and a photoelectric conversion panel disposed aligned with the screen, the photoelectric conversion panel being irradiated with a light beam from the projector.

The screen may be irradiated with a first light beam from the projector, the photoelectric conversion panel may be irradiated with a second light beam from the projector, the second light beam being in a wavelength band different from a wavelength band of the first light beam, and conversion efficiency of the photoelectric conversion panel may be maximum in the wavelength band of the second light beam.

The second light beam may be an invisible light beam.

There may further be provided a power supply device to generate an application voltage based on power generated by the photoelectric conversion panel and to apply the application voltage to the electrodes; and a controller to control the application voltage, wherein the controller may control the application voltage so as to operate the particles in the particle layer.

The controller may control the application voltage so as to repeatedly rotate the particles within an angular range less than 180°.

The controller may control at least orientations or positions of the particles by the application voltage so that the first part covers at least part of the second part from an observer's side along a direction of normal to the screen.

There may be provided a display apparatus including:

a projector to emit a coherent light beam; and the above-described screen.

There may further be provided a power source to apply a voltage to the electrodes of the screen; and a controller to control an application voltage from the power source to the electrodes, wherein the controller may control the application voltage of the power source so as to operate the particles in the particle layer.

The controller may control the application voltage so as to repeatedly rotate the particles within an angular range less than 180°.

The controller may control at least orientations or positions of the particles by the application voltage of the power source so that the first part covers at least part of the second part from an observer's side along a direction of normal to the screen.

There may be provided a display apparatus including:

a projector to emit a light beam formed with a laser light beam; and the above-described photoelectric conversion panel-equipped screen.

There may be provided a display apparatus including:

the above-described photoelectric conversion panel-equipped screen; and a projector to radiate a first light beam formed with a laser light beam to the screen and simultaneously radiate a second light beam in a wavelength band different from a wavelength band of the first light beam to the photoelectric conversion panel, wherein conversion efficiency of the photoelectric conversion panel may be maximum in the wavelength band of the second light beam.

There may be provided a method of using the above-described screen, including:

operating the particles in the particle layer while a light beam is being radiated to the screen.

The particles may be repeatedly rotated within an angular range less than 180° while a light beam is being radiated to the screen.

At least either of orientations and positions of the particles may be controlled so that the first part covers at least part of the second part from an observer's side along a direction of normal to the screen while the screen is being irradiated with a light beam.

There may be provided a particle to be used for a screen which displays an image by being irradiated with a light beam from a projector, including a first part and a second part different in dielectric constant from each other.

The particle may have a monochrome color.

Either of the first part and the second part may be transparent.

A volume ratio of the first part may be larger than a volume ratio of the second part.

The first part may have a light diffusing function and the second part may have a light absorbing function.

There may be provided the first part and the second part in contact with each other at an interface of a curved shape,
wherein the first part may be transparent.

Volumes of the first part and the second part may be different from each other.

The first part may be larger than the second part in volume,
wherein a surface of the second part, the surface being in contact with the interface, may have a convex shape.

The first part may be smaller than the second part in volume,
wherein a surface of the second part, the surface being in contact with the interface, may have a concave shape.

The second part may have a light diffusing or absorbing function.

The second part may be a sphere or an oval sphere.

According to an aspect of the present disclosure, there is provided a particle to be used for a screen which displays an image using a light beam from a projector, including:
a transparent first part;
a transparent second part different from the first part in dielectric constant; and
a third part in surface contact with the first part and with the second part, the third part controlling an incident light from the first part.

The third part may scatter or reflect an incident light beam from the first part.

A thickness between the first face of and the second face of the third part may be thinner than a maximum thickness of the first face of the first part in a direction of normal to the first face of the first part, and
a thickness between the first face of and the second face of the third part may be thinner than a maximum thickness of the second face of the third part in a direction of normal to the second face of the third part.

The third part may be lower than the first part and the second part in visible light transmittance.

The first face and the second face may have a circular shape or an oval shape and the third part may be a disc, an oval disc, a cylinder or an elliptic cylinder.

There may be provided a particle layer including the above-described particle.

There may be provided a particle layer including the above-described particle.

According to an aspect of the present disclosure, there may be provided a light control sheet to control a light beam including a plurality of particles,
wherein the particles includes:
a transparent first part;
a transparent second part different from the first part in dielectric constant; and
a third part in surface contact with the first part and with the second part, the third part controlling an incident light from the first part.

The third part may scatter, reflect or absorb an incident light beam from the first part.

A thickness between the first face of and the second face of the third part may be thinner than a maximum thickness of the first face of the first part in a direction of normal to the first face of the first part, and
a thickness between the first face of and the second face of the third part may be thinner than a maximum thickness of the second face of the third part in a direction of normal to the second face of the third part.

The third part may be lower than the first part and the second part in visible light transmittance.

The first face and the second face may have a circular shape or an oval shape and the third part may be a disc, an oval disc, a cylinder or an elliptic cylinder.

There may be provided electrodes to form an electric field inside the particle layer,
wherein the particle layer may rotate the first to third parts for at least part of the particles by an alternating current voltage applied to the electrodes.

According to the present disclosure, speckles can be sufficiently reduced.

DETAILED DESCRIPTION OF THE INVENTION

Hereinafter, embodiments of the present disclosure will be explained with reference to the drawings. In the accompanying drawings of the present specification, for simplicity of drawings and easy understanding, the scale, the ratio of height to width, etc. are appropriately modified or enlarged from actual ones.

First Embodiment

Figure 1:
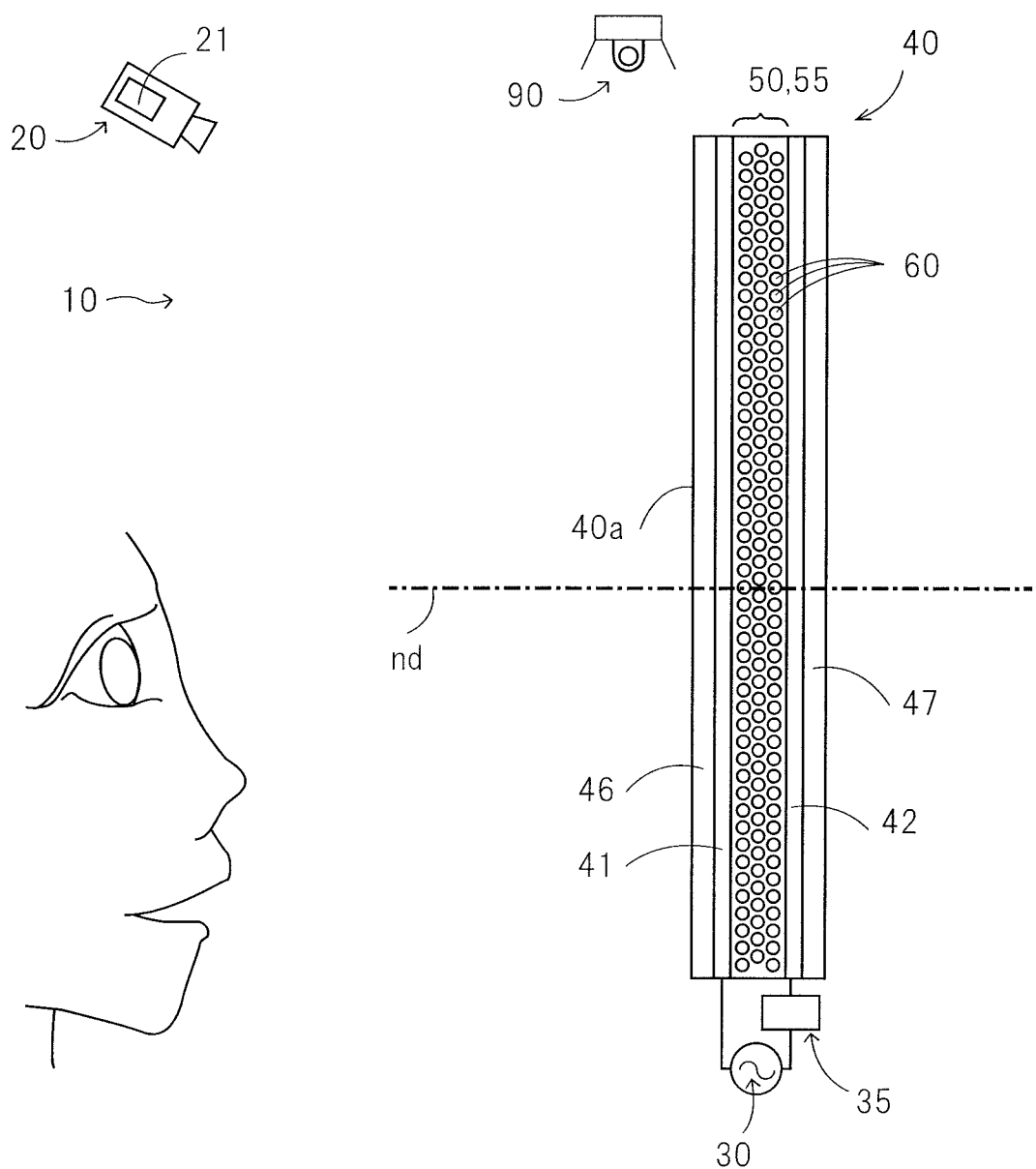
FIG. 1 is an illustration for explaining an embodiment of the present disclosure and is a sectional view showing a display apparatus.
Figure 2:
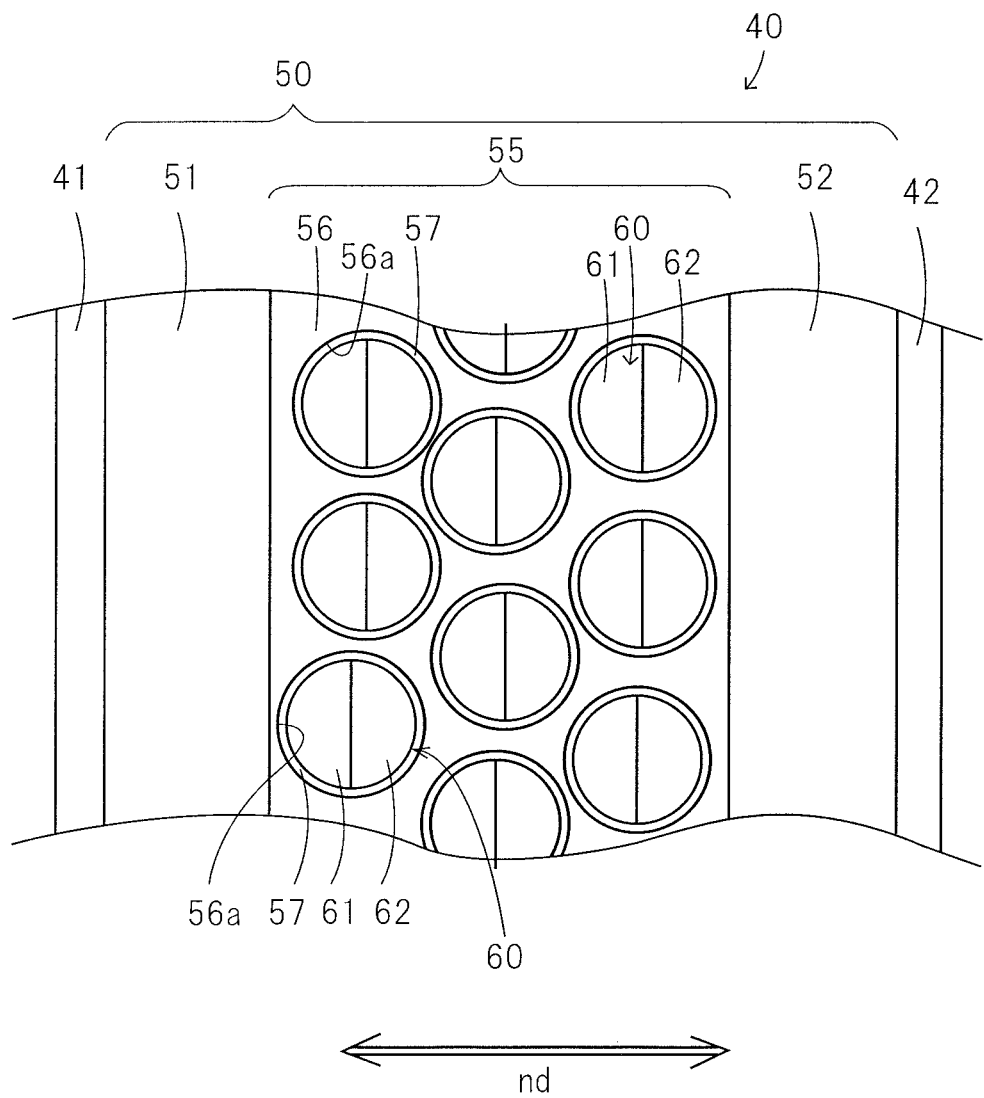
FIG. 2 is a longitudinal sectional view showing a screen of a display apparatus.
Figure 3:
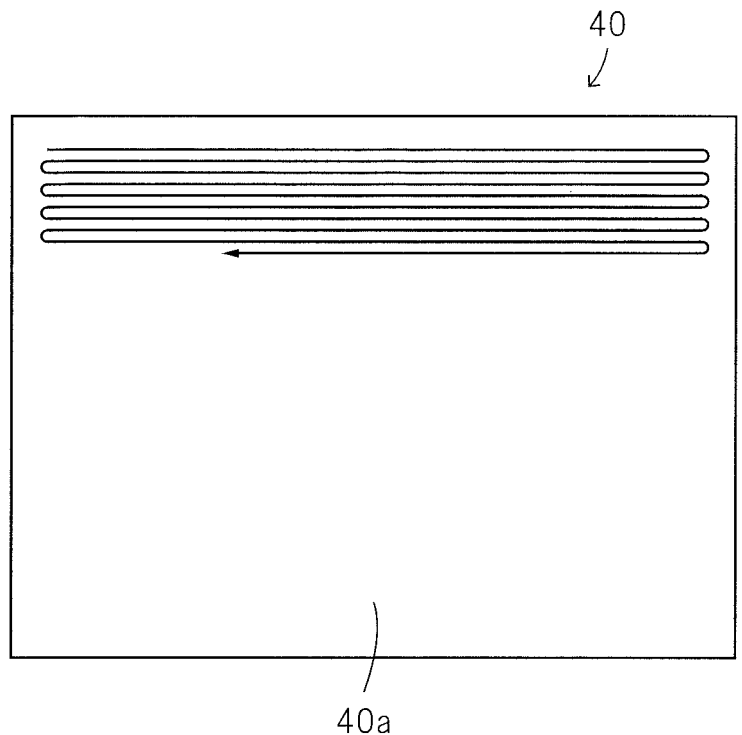
FIG. 3 is a plan view showing a screen and an illustration for explaining a method of radiating an image light beam onto the screen from a projector of a display apparatus.
Figure 4:
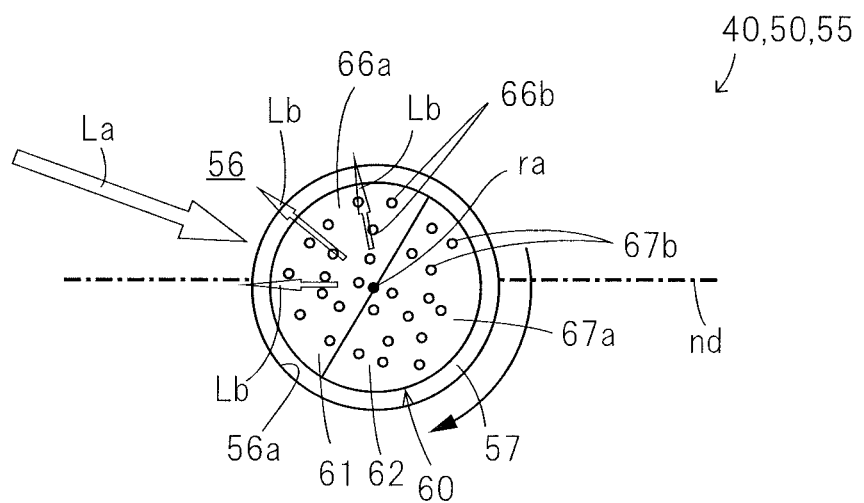
FIG. 4 is an illustration for explaining an operation of a particle of a particle layer.
Figure 5:
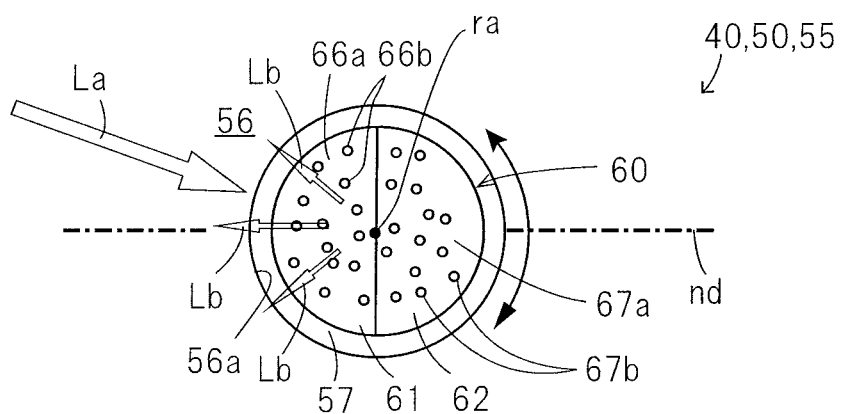
FIG. 5 is an illustration for explaining an operation of the particle of the particle layer.
Figure 6:
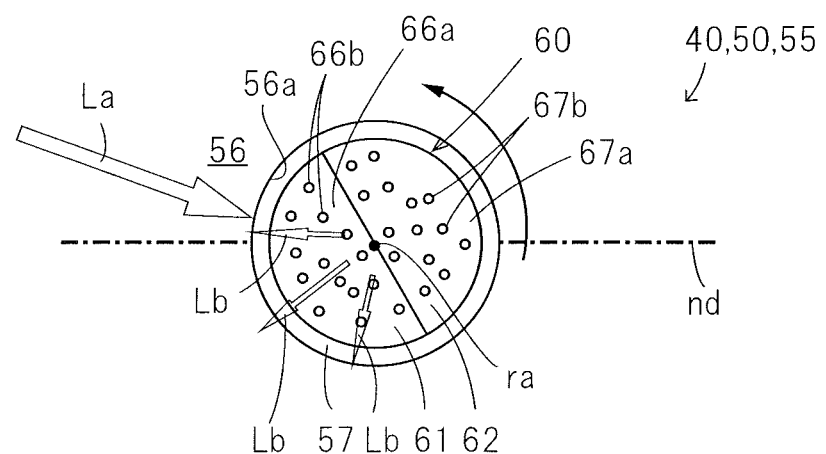
FIG. 6 is an illustration for explaining an operation of the particle of the particle layer.
Figure 7:
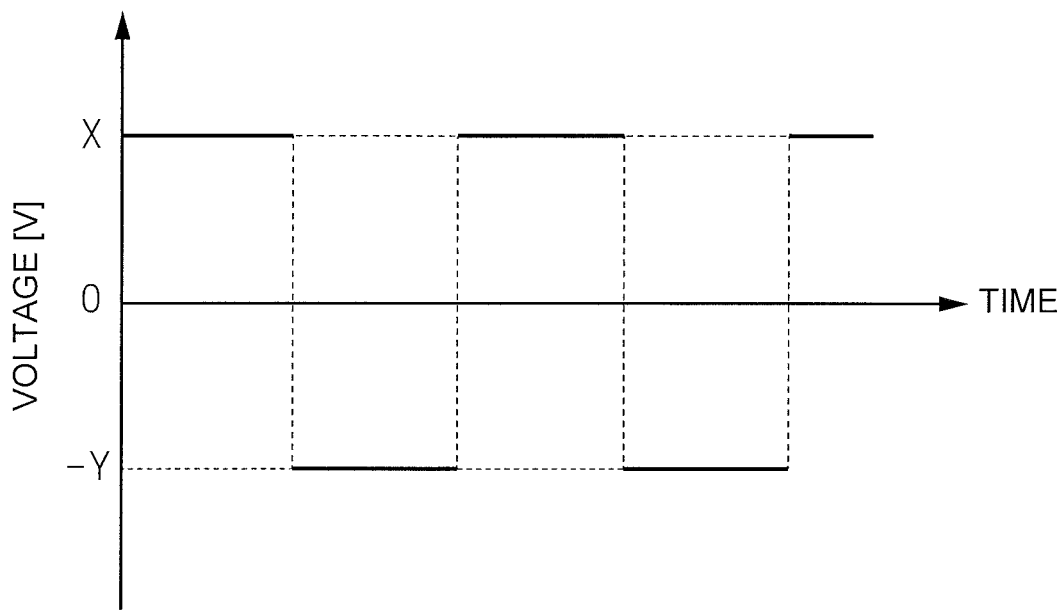
FIG. 7 is a graph showing an example of a voltage applied to a screen.

FIGS. 1 to 6 are illustrations for explaining a first embodiment of the present disclosure. FIG. 1 is an illustration showing a display apparatus. FIG. 2 is a longitudinal sectional view showing a screen. FIG. 3 is an illustration for explaining a radiation method of an image light beam onto the screen. FIGS. 4 to 6 are illustrations for explaining an operation of the screen. FIG. 7 is a graph showing an example of a voltage applied to the screen from a power source.

As shown in FIGS. 1 to 6, a display apparatus 10 has a projector 20 and a screen 40 to be irradiated with an image light beam from the projector 20. As described later, the screen 40 is capable of changing with time the diffusion characteristics that affect an incident light beam. In this way, speckles become inconspicuous. In relation to such function of the screen 40, the display apparatus 10 further has a power source 30 and a controller 35. The power source 30 applies a voltage to the screen 40. The controller 35 adjusts the applied voltage from the power source 30 to control the mode of the screen 40. Moreover, the controller 35 controls the operation of the projector 20. As an example, the controller 35 is a general-purpose computer.

The projector 20 projects a light beam for forming an image, that is, an image light beam, onto the screen 40. In the example shown, the projector 20 has a coherent light source 21 for oscillating a coherent light beam and a scanning device (not shown) for adjusting an optical path of the coherent light source 21. The coherent light source 21 is, as a typical example, made up of a laser light source for oscillating a laser light beam. The coherent light source 21 may have a plurality of coherent light sources for generating light beams in wavelength ranges different from one another.

In the example shown, the projector 20 projects a coherent light beam onto the screen 40 in a raster scanning mode. As shown in FIG. 3, the projector 20 projects the coherent light beam onto the screen 40 so as to scan the entire area of the screen 40. Scanning is performed at high speeds. In accordance with an image to be formed, the projector 20 stops emission of the coherent light beam from the coherent light source 21. In other words, the coherent light beam is projected onto only a position on the screen 40 at which the image is to be formed. As a result, the image is formed on the screen 40. The operation of the projector 20 is controlled by the controller 35.

Subsequently, the screen 40 will be explained. In the example shown in FIGS. 1 and 2, the screen 40 has a particle sheet 50 having a plurality of particles, and electrodes 41 and 42 connected to the power source 30. The first electrode 41 is spread in a planar shape over one main surface of the particle sheet 50. The second electrode 42 is spread in a planar shape over the other main surface of the particle sheet 50. Moreover, the shown screen 40 has a first cover layer 46 that covers the first electrode 41 to form one outermost surface of the screen 40 and a second cover layer 47 that covers the second electrode 42 to form the other outermost surface of the screen 40.

In the example shown, the screen 40 is a reflection-type screen. The projector 20 projects an image light beam onto a display-side surface 40a made up of the first cover layer 46. The image light beam passes through the first cover layer 46 and the first electrode 41 of the screen 40 and, thereafter, is reflected on the particle sheet 50 by diffuse reflection. As a result, an observer situated to face the display-side surface 40a of the screen 40 can observe an image.

The first electrode 41 and the first cover layer 46 through which the image light beam passes are transparent. It is preferable that the first electrode 41 and the first cover layer 46 each have transmittance of 80% or higher in a visible light range and, more preferably 84% or higher. Visible light transmittance is defined as an average value of transmittance at wavelengths measured in a measurement wavelength range from 380 nm to 780 nm using a spectrophotometer ("UV-3100PC" made by Shimadzu Corporation, a product conforming to JISK0115).

As a conductive material to make up the first electrode 41, ITO (Indium Tin Oxide), InZnO (Indium Zinc Oxide), Ag nanowire, carbon nanotube, etc. can be used. The first cover layer 46 is a layer for protecting the first electrode 41 and the particle sheet 50. The first cover layer 46 can be formed with transparent resin, for example, polyethylene terephthalate excellent in stability, or polycarbonate, cycloolefin polymer, etc.

The second electrode 42 can be formed in the same manner as the first electrode 41. The second cover layer 47 can be formed in the same manner as the first cover layer 46. However, the second electrode 42 is not required to be transparent. Therefore, the second electrode 42, can, for example, be formed with a metal thin film of aluminum, copper, etc. The second electrode 42 made of a metal film can also function as a reflective layer to reflect an image light beam in the reflective-type screen 40. The second cover layer 47 can be formed in the same manner as the first cover layer 46.

Subsequently, the particle sheet 50 will explained. As shown in FIG. 2, the particle sheet 50 has a pair of base members 51 and 52, and a particle layer 55 disposed between the pair of base members 51 and 52. The first base member 51 holds the first electrode 41 and the second base member 52 holds the second electrode 42. The particle layer 55 is sealed between the first base member 51 and the second base member 52. The first base member 51 and the second base member 52 can be formed with a material having strength to be able to function to seal the particle layer 55 and have a function as a holder of the electrodes 41 and 42, and the particle layer 55, which is, for example, a polyethylene terephthalate resin film. In the embodiment shown, the screen 40 is a reflective-type screen in which an image light beam passes through the first base member 51. Therefore, the first base member 51 is transparent and preferably has visible light transmittance at the same level as the first electrode 41 and the first cover layer 46.

Subsequently, the particle layer 55 will be explained. As shown well in FIG. 2, the particle layer 55 has a large number of particles 60 and a holder 56 for holding the particles 60. The holder 56 holds the particles 60 so as to be operable. In the example shown, the holder 56 has a large number of cavities 56a. Each particle 60 is accommodated in each cavity 56a. The inner size of each cavity 56a is larger than the outer size of the particle 60 in the cavity 56a. Therefore, the particle 60 is operable inside the cavity 56a. The holder 56 swells by a solvent 57. The cavity 56a is filled with a solvent 57 between the holder 56 and the particles 60. By means of the holder 56 swelling with the solvent 57, a smooth operation of the particles 60 can be secured stably. Hereinbelow, the holder 56, the solvent 57, and the particles 60 will be explained in order.

First of all, the holder 56 and the solvent 57 will be explained. The solvent 57 is used for a smooth operation of the particles 60. When the holder 56 swells, the solvent 57 is held inside each cavity 56a. It is preferable that the solvent 57 has low polarity so as not to obstruct an operation of the particles 60 in response to electric fields. As the low-polarity solvent 57, a variety of types of materials that make smooth the operation of the particles 60 can be used. As examples of the solvent 57, dimethyl silicon oil, an isoparaffin-based solvent, straight-chain paraffin-based solvent, and straight-chain alkane, such as dodecane and tridecane, can be listed up.

Subsequently, the holder 56 can be formed, as an example, with an elastomer sheet made of elastomer. The holder 56 as the elastomer sheet is capable of making the above-described solvent 57 swell. As a material of the elastomer sheet, silicon resin, (slightly crosslinked) acrylic resin, (slightly crosslinked) styrene resin, polyolefin resin, etc. can be listed up, as examples.

In the example shown, the cavities 56a are distributed at high density in the holder 56, in the plane direction of the screen 40. The cavities 56a are also distributed in the direction of normal nd to the screen 40. In the example shown, a group of the cavities 56a spread in a planar shape are aligned in three layers in a depth direction of the screen 40.

Subsequently, the particles 60 will be explained. The particles 60 have a function of changing the travel direction of an image light beam projected from the projector 20. In the example shown, the particles 60 have a function of diffusing the image light beam, especially, by diffuse reflection.

Each particle 60 includes a first part 61 and a second part 62 different in dielectric constant. Therefore, when this particle 60 is placed in an electric field, an electron dipole moment is generated in the particle 60. In this occasion, the particle 60 operates in such a manner that a vector of the electron dipole moment is oriented in a complete opposite direction of a vector of the electric field. Therefore, when a voltage is applied between the first electrode 41 and the second electrode 42 so that an electric field is generated in the particle sheet 50 located between the first electrode 41 and the second electrode 42, the particle 60 operates in each cavity 56a in such a manner that the particle 60 takes a stable posture with respect to the electric field, that is, a stable position and orientation with respect to the electric field. The screen 40 changes its diffusion wavefront in accordance with the operation of the particles 60 having a light diffusion function.

The particles 60 each including the first part 61 and the second part 62 different in dielectric constant can be produced by a variety of methods including known techniques. The particles 60 can be produced by, for example, a method to align spherical particles of organic or inorganic matters in a single layer using an adhesive tape or the like, with deposition of a resin component layer or of an inorganic matter layer, to be charged with positive and negative electricity different from the particles, on a hemisphere of each particle (a deposition method, for example, Japanese Patent Laid-Open No. S56-67887), a method using a rotary disc (for example, Japanese Patent Laid-Open No. H6-226875), a method to make droplets of different dielectric constants in contact with each other in air by a splaying method or an ink jet method to form a single droplet (for example, Japanese Patent Laid-Open No. 2003-140204), and a microchannel production method proposed in JP2004-197083A. As proposed in JP2004-197083A, the first part 61 and the second part 62 different from each other in dielectric constant can be formed with materials different in charging characteristics from each other. The microchannel production method is to use a continuous phase and a spheroidizing phase having an oily/aqueous (O/W type) or aqueous/oily (W/O type) relationship with each other and to sequentially discharge a continuous phase including two kinds of materials different in charging characteristics from each other, from a first microchannel, through which the continuous phase is transferred, into the spheroidizing phase of a fluid medium that flows through a second microchannel, thereby producing bipolar particles 60 that are two-layer polymer particles 60 and have polarities of (±) in charge.

In the microchannel production method, in an oily or aqueous fluid medium including polymerizable resin components, polymerizable resin components, which are in the continuous phase that is a separated phase insoluble to the fluid medium, are formed, using polymerizable monomers that are charged with positive and negative polarities different from each other, and are transferred to the first microchannel. The continuous phase is then discharged sequentially or intermittently into an aqueous or oily spheroidizing phase that flows in the second microchannel. The matters discharged into the spheroidizing phase are spheroidized during a series of discharge, dispersion, and transfer in the microchannels. Therefore, the particles 60 are prepared by polymerizing and hardening polymerizable resin components in the spheroidized matters while the polymerizable resin components are being subjected to UV radiation and/or heating.

As the polymerizable resin components (or the polymerizable monomers) to be used for particles 60, monomer types, by which the particles 60 have an tendency of being charged with polarities of (−) and (+) depending on the kinds of a functional group or substituent of the polymerizable monomers to be used for particles 60, can be listed up. Therefore, when at least two kinds of monomers are used as the polymerizable resin components, it is preferable that a plurality of monomers having a tendency of being charged with the same polarity are combined in an appropriate manner on condition that the tendency of being charged with polarities of (+) and (−) is well understood. In addition, an additive such as a polymerization initiator, besides the monomers, is added after the additive is adjusted so as not to loose chargeability in the entire material.

In the polymerizable resin components (or the polymerizable monomers) having at least one kind of functional group and/or substituent in molecules, as the functional group or substituent, for example, a carbonyl group, a vinyl group, a phenyl group, an amino group, an amide group, an imide group, a hydroxyl group, a halogen group, a sulfonic acid group, an epoxy group, and urethane coupling can be listed up. A single monomer type having such functional groups or substituents in the polymerizable monomers can be appropriately used. Or two or more monomer types having such functional groups or substituents in the polymerizable monomers can be combined to be appropriately used.

As a polymerizable monomer having a tendency of being charged with a polarity of (−) and a polymerizable monomer having a tendency of being charged with a polarity of (+), those described in JP2004-197083A can be used, and hence the explanation thereof is omitted in this description.

When producing the particles 60 with the microchannel production method, by adjusting the speed, the joint direction, etc., in the case where the two kinds of polymerizable resin components that constitute the continuous phase are joined to each other, and by adjusting the speed, the discharge direction, etc., in the case where the continuous phase is discharged into the spheroidizing phase, the outer shape of the obtained particles 60, the interface shape between the first part 61 and the second part 62 of each particle 60, etc. can be adjusted. In the example of the particle 60 shown in FIGS. 4 to 6, the volume ratio of the first part 61 and the volume ratio of the second part 62 are the same as each other. Moreover, in the example of the particle 60 shown in FIGS. 4 to 6, the interface between the first part 61 and the second part 62 is formed into a planar shape. And the particle 60 shown in FIGS. 4 to 6 is a sphere. That is, in the particle 60 shown in FIGS. 4 to 6, the first part 61 and the second part 62 are each a hemisphere.

When the two kinds of polymerizable resin components that constitute the continuous phase include diffused components, the first part 61 and the second part 62 of the particle 60 can be given an internal diffusion function. In the example shown in FIGS. 4 to 6, the first part 61 of the particle 60 has a first main part 66a and a first diffused component 66b diffused in the first main part 66a. In the same manner, the second part 62 has a second main part 67a and a second diffused component 67b diffused in the second main part 67a. In other words, the sphere particle 60 shown in FIGS. 4 to 6 is capable of developing a diffusion function to a light beam travelling inside the first part 61 and a light beam travelling inside the second part 62. Here, the diffused components 66b and 67b are components capable of exerting an action to change the travel direction of a light beam travelling inside the particle 60 by reflection, refraction, etc. Such light diffusion function (light scattering function) of the diffused components 66b and 67b is given by, for example, forming the diffused components 66b and 67b with materials having refractive indexes different from those of the materials that constitute the main parts 66a and 67a of the particle 60 or with materials capable of exerting a reflection operation to a light beam. As the materials having refractive indexes different from those of the materials that constitute the main parts 66a and 67a, resin beads, glass beads, a metal compound, a porous material containing a gas, and mere babbles are listed up as examples.

In the example shown, the particles 60 have a monochrome color. In other words, the first part 61 and the second part 62 have the same color. The color of the first part 61 and the second part 62 can be adjusted by adding a coloring material such as a pigment and a dye to the first part 61 and the second part 62. As the pigment and the dye, a variety of known pigments and dyes can be used. As examples, pigments disclosed in JP2005-99158A and JP2780723B, pigments or dyes disclosed in JP5463911B can be used.

The monochrome color to be used for the particles 60 is meant to have a uniform color, the level of uniformness being to the extent that color change on the screen 40 cannot be perceived by an observer who observes the display-side surface 40a of the screen 40 with normal power of observation even if the particles 60 operate in the particle sheet 50 in the state where no image display is performed on the screen 40. In other words, if the display-side surface 40a of the screen 40 in the state where the first part 61 of each particle 60 is oriented toward the display-side surface 40a of the screen 40 and the display-side surface 40a of the screen 40 in the state where the second part 62 of each particle 60 is oriented toward the display-side surface 40a of the screen 40 are perceived as having the same color with normal power of awareness of the observer in the state where no image display is performed on the screen 40, it can said that the particles 60 have a monochrome color. In more specifically, it is preferable that, between the display-side surface 40a of the screen 40 in the state where the first part 61 of each particle 60 is oriented toward the display-side surface 40a of the screen 40 and the display-side surface 40a of the screen 40 in the state where the second part 62 of each particle 60 is oriented toward the display-side surface 40a of the screen 40, a color difference $\Delta E^*ab (=[(\Delta L^*)^2+(\Delta a^*)^2+(\Delta b^*)^2]^{1/2})$ is 1.5 or smaller. The color difference $\Delta E^*ab$ is defined as a value specified based on brightness $L^*$, and chromaticity $a^*$ and $b^*$ in the $L^*a^*b^*$ color appearance system measured using a colorimeter (CM-700d) made by Konica Minolta in conformity with JIS Z 8730. When the screen 40 is a reflection type, evaluation is made with a value of ΔE*ab specified based on brightness L*, and chromaticity a* and b* of a reflected light beam. When the screen 40 is a transmission type, evaluation is made with a value of ΔE*ab specified based on brightness L*, and chromaticity a* and b* of a transmitted light beam.

The particle layer 55, the particle sheet 50, and the screen 40 can be produced as described below as an example.

The particle layer 55 can be produced by a production method disclosed in JP1-28259A. That is, first of all, an ink in which the particles 60 are dispersed in polymerizable silicon rubber is prepared. Subsequently, the ink is stretched by a coater or the like and polymerized by heating or the like to be formed into a sheet. By these steps, the holder 56 that holds the particles 60 is obtained. Subsequently, the holder 56 is dipped into the solvent 57 such as silicon oil for a certain period of time. When the holder 56 swells, a gap filled with the solvent 57 is formed between the holder 56 made of silicon rubber and each particle 60. As a result, the cavities 56a that accommodate the solvent 57 and the particles 60 are defined. As described above, the particle layer 55 can be produced.

Subsequently, by a production method disclosed in JP2011-112792A, the screen 40 can be produced using the particle layer 55. First of all, the particle layer 55 is covered with the pair of base members 51 and 52, and sealed by lamination or using an adhesive or the like. In this way, the particle sheet 50 is produced. Subsequently, the first electrode 41 and the second electrode 42 are disposed on the particle sheet 50, and furthermore, the first cover layer 46 and the second cover layer 47 are disposed thereon to obtain the screen 40.

Subsequently, an operation in displaying an image using this display apparatus 10 will be explained.

First of all, under control by the controller 35, the coherent light source 21 of the projector 20 oscillates a coherent light beam. The light beam from the projector 20 is subjected to optical path adjustments by a scanning device not shown and is radiated onto the screen 40. As shown in FIG. 3, the scanning device not shown adjusts the optical path of the light beam so that the light beam scans the display-side surface 40a of the screen 40. Emission of the coherent light beam by the coherent light source 21 is controlled by the controller 35. In accordance with an image to be displayed on the screen 40, the controller 35 stops the emission of the coherent light beam from the coherent light source 21. The operation of the scanning device included in the projector 20 is performed at a high speed to the extent that it cannot be resolved by human eyes. Therefore, the observer observes simultaneously light beams radiated onto respective points on the screen 40 at a given time interval.

A light beam projected onto the screen 40 passes through the first cover layer 46 and the first electrode 41, and then reaches the particle sheet 50. The light beam is reflected on the particles 60 of the particle sheet 50 by diffuse reflection and emitted toward several directions in the observer's side of the screen 40. Therefore, at respective points of the screen 40 in the observer's side, reflected light beams from respective points on the screen 40 can be observed. As a result, an image corresponding to an area irradiated with the coherent light beams on the screen 40 can be observed.

The coherent light source 21 may include a plurality of light sources that emit coherent light beams of wavelengths different from one another. In this case, the controller 35 controls a light source corresponding to a light beam of each wavelength independently from the other light sources. As a result, it is possible to display a color image on the screen 40.

When a coherent light beam is used to form an image on a screen, speckles of a spot pattern are observed. One cause of the speckles is considered that, after a coherent light beam, a typical example of which is a laser beam, is diffused on the screen, the coherent light beam generates an interference pattern on an optical sensor (retinas in the case of human beings). Above all, when a coherent light beam is radiated onto the screen by raster scanning, the coherent light beam is incident on respective points on the screen from a constant incidence direction. Therefore, when the raster scanning is adopted, speckle wavefronts generated at the respective points on the screen are unchanged as long as the screen does not swing, and when the speckle pattern is viewed by the observer, the image quality of a displayed image is drastically degraded.

To the contrary, the screen 40 of the display apparatus 10 according to the present embodiment changes diffusion wavefront with time. When the diffusion wavefront on the screen 40 changes, speckle patterns on the screen 40 change with time. When the diffusion wavefront changes with time at a sufficiently high speed, the speckle patterns are overlapped one another and averaged to be observed by the observer. As a result, speckles become inconspicuous.

The shown screen 40 has a pair of electrodes 41 and 42. The pair of electrodes 41 and 42 are electrically connected to the power source 30. The power source 30 is capable of applying a voltage to the pair of electrodes 41 and 42. When the voltage is applied between the pair of electrodes 41 and 42, an electric field is formed in the particle sheet 50 located between the pair of electrodes 41 and 42. The particle layer 55 of the particle sheet 50 holds the particles 60 so as to be operable, each including the first part 61 and the second part 62 different in dielectric constant. Since the particles 60 have been charged or a dipole moment is generated when an electric field is formed in at least the particle layer 55, the particles 60 operate in accordance with a vector of the formed the electric field. When the particles 60 operate, which have a function of changing a light travel direction, such as, a reflection function and a diffusion function, as shown in FIGS. 4 to 6, the diffusion characteristics of the screen 40 change with time. As a result, speckles become inconspicuous. In FIGS. 4 to 6, and FIGS. 8 and 10 which will be referred to later, a sign "La" is an image light beam radiated from the projector 20 to the screen 40 and signs "Lb" are image light beams diffused by the screen 40.

Concerning the difference in dielectric constants between the first part 61 and the second part 62 of each particle 60, it is enough for the dielectric constants to be different to the extent that a speckle reducing function can be exerted. Therefore, whether the dielectric constants between the first part 61 and the second part 62 of the particle 60 are different from each other can be determined by whether the particle 60 held operable can operate in accordance with the change in electric field vector.

The operating principle of the particles 60 to the holder 56 is to change the orientation and position of each particle 60 so that the electric charge or dipole moment of the particle 60 has a stable positional relationship with an electric field vector. Therefore, when a constant electric field is continuously applied to the particle layer 55, the operation of the particle 60 stops after a certain period of time. On the other hand, in order to make speckles inconspicuous, it is required that the operation of the particle 60 to the holder 56 continues. Accordingly, the power source 30 applies a voltage so that an electric field formed in the particle layer 55 varies with time. In the example shown, the power source 30 applies a voltage between the pair of electrodes 41 and 42 so as to invert the vector of an electric field generated in the particle sheet 50. For example, in an example shown in FIG. 7, the power source 30 repeatedly applies a voltage X[V] and a voltage −Y[V] to the pair of electrodes 41 and 42 of the screen 40. Together with such application of an inverted electric field, as an example, the particle 60 can repeatedly operate between the states of FIGS. 6 and 7 with the state of FIG. 5 as a center state.

The control of an application voltage in FIG. 7 is extremely easy. Above all, in the example shown in FIG. 7, the voltage X[V] and the voltage −Y[V] have the same absolute value, under extremely simple control. Nevertheless, the application voltage shown in FIG. 7 is just an example. The voltage X[V] and the voltage −Y[V] may have different absolute values. Moreover, voltages of three or more different values may be applied. Furthermore, the application voltage may continuously vary by adopting an ordinary alternating current voltage, for example.

The particles 60 are accommodated in the cavities 56a formed in the holder 56. In the example shown in FIGS. 4 to 6, each particle 60 has an almost sphere outer shape. Each cavity 56a that accommodates the particle 60 has an almost sphere inner shape. Therefore, the particle 60 can perform rotational vibration having a rotation axis line ra, as a center, which extends in a direction perpendicular to the drawing sheets of FIGS. 4 to 6. Depending on the size of the cavity 56a that accommodates the particle 60, the particle 60 performs, not only the repeated rotary motion, but also translational motion. The cavity 56a is filled with the solvent 57. The solvent 57 makes smooth the operation of the particle 60 to the holder 56.

Figure 35A:
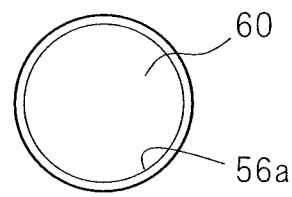
FIGS. 35A, 35B and 35C are illustrations showing examples of a holder that has a single cavity including a single particle.
Figure 35B:
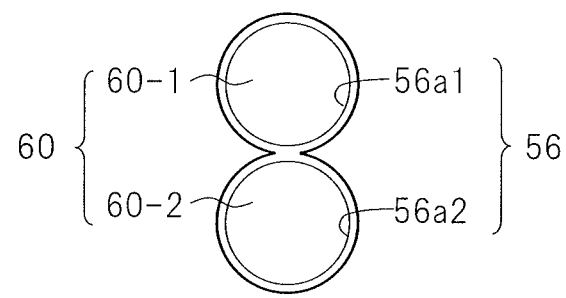
Figure 35C:
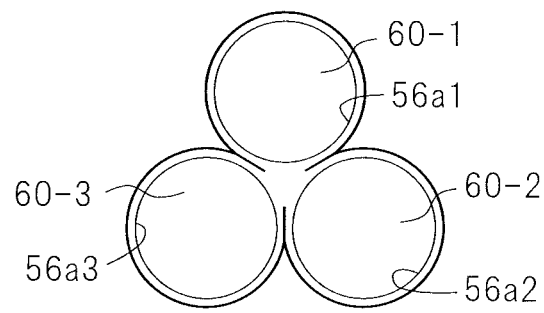

As shown in FIGS. 35A to 35C, each cavity 56a owned by the holder 56 in the particle layer 55 may be configured to include a single particle 56. FIG. 35A shows a holder 56 in which a single cavity 56a includes a single particle 56. FIG. 35B shows a holder 56 in which two cavities 56a1 and 56a2 coupled to each other include a single particle 60-1 and 60-2, respectively. The particles 60-1 and 60-2 are subjected to movable range restriction by the associated cavities 56a1 and 56a2, respectively. FIG. 35C shows a holder 56 in which three cavities 56a1, 56a2, and 56a3 coupled to one another include a single particle 60-1, 60-2, and 60-3, respectively. The particles 60-1, 60-2, and 60-3 are subjected to movable range restriction by the associated cavities 56a1, 56a2, and 56a3, respectively. As described above, even though a plurality of cavities are coupled to one another, when the movable ranges of a plurality of particles are arranged without overlapping one another, the cavities owned by the holder 56 can each be regarded as being configured to include a single particle.

There is no restriction on the internal diameter of each cavity as long as it is larger than the outer diameter of a particle contained in the cavity. For example, the internal diameter of each cavity may be set to be 1.1 times to 1.3 times as large as the outer diameter of a particle contained in the cavity.

In the present embodiment described above, the screen 40 has the particle layer 55 that has the particles 60 each including the first part 61 and the second part 62 that are different in dielectric constant, and has the electrodes 41 and 42 that form an electric field for driving the particles 60 of the particle layer 55, by being applied with a voltage. In the screen 40, when a voltage is applied between the first electrode 41 and the second electrode 42, an electric field is formed in the particle layer 55. In this occasion, the particles 60 operate in accordance with the formed electric field. When the particles 60 operate, which have a function of changing a light travel direction, such as, a reflection function and a diffusion function, the diffusion characteristics of the screen 40 change with time. Therefore, while a light beam is being radiated onto the screen 40, by forming the electric field in the particle layer 55 to operate the particles 60, it is possible to efficiently make the speckles inconspicuous. It is relatively easy to produce such screen 40, for example, using the above-described production method. In addition, the screen 40 is suitable for a large screen and excellent in durability and operational stability, and furthermore, easily-controllable.

Moreover, according to the present embodiment, each particle 60 including the first part 61 and the second part 62 that are different in dielectric constant is formed to have a monochrome color. Therefore, even though at least one of the orientation and position of the particle 60 changes, the screen 40 has a constant color. Accordingly, when displaying an image, it is not perceived that the tone of the screen 40 is changed. As a result, it is also possible to efficiently avoid image quality degradation in accordance with color change in the screen 40. The particles 60 operable in an electric field and having a monochrome color can be produced by forming the first part 61 and the second part 62 from synthetic resins of the same kind and by mixing a charging additive into one of the first part 61 and the second part 62. Accordingly, such useful particles 60 for the screen 40 can be easily produced.

Furthermore, according to the present embodiment, while a light beam is being radiated onto the screen 40, the particles 60 can be repeatedly rotated in the particle layer 55. In other words, the particles 60 can operate to effectively change the diffusion fronts in an extremely small space. Nevertheless, since it is possible to keep the screen diffusion characteristics constant, it is possible to reduce speckles only, while keeping parameters constant, such as screen brightness. Therefore, by repeatedly rotating the particles 60, while realizing a thin particle layer 55 and a thin screen 40, speckles can be effectively made inconspicuous. When repeatedly rotating each particle 60, its angular range is preferably less than 180° as shown in FIGS. 4 to 6. In this case, either of the first part 61 and the second part 62 can mainly be situated on the observer's side. In other words, while a light beam is being radiated onto the screen 40, it is possible that the first part 61 covers at least part of the second part 62 when viewed from the observer's side along the direction of normal nd to the screen 40. Accordingly, even if the first part 61 and the second part 62 do not have exactly the same color, during image display while operating the particles 60, the change in tone of the screen 40 can be hardly perceived.

Figure 36:
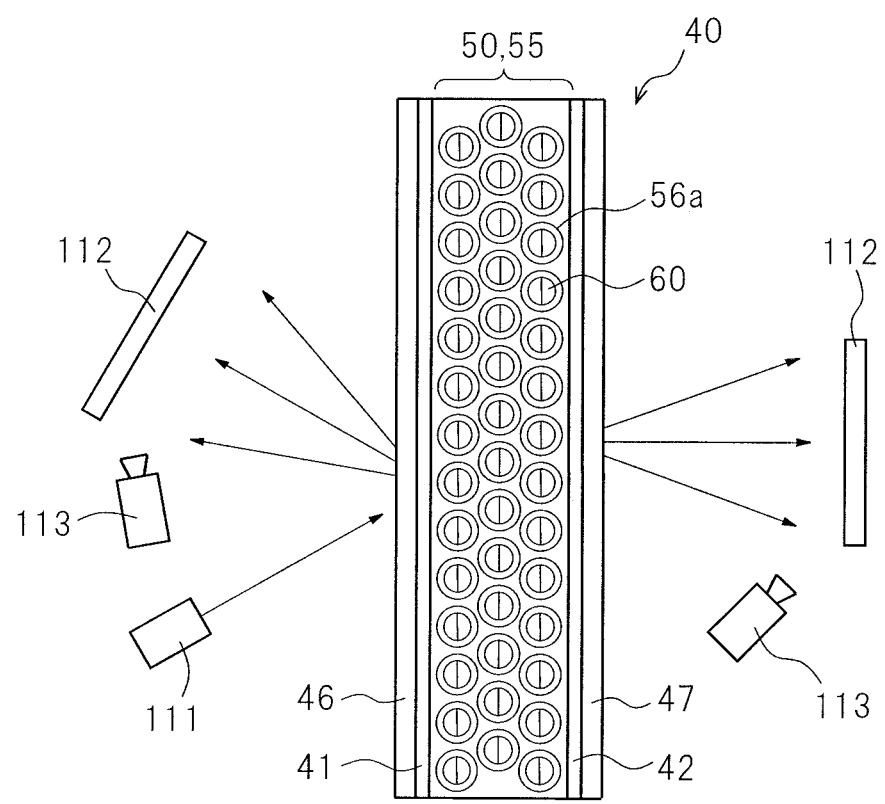
FIG. 36 is an illustration for explaining a method of measuring whether a particle in a screen rotates.

It can be checked by the following method that the particles 60 are rotating. In a specific manner, as shown in FIG. 36, a coherent light beam is radiated onto the screen 40 from a light source 111. A coherent light beam that has passed through or reflected by the screen 40, that is, diffused light beams, is radiated onto a screen 112 for measurements. Then, the light intensity distribution on the screen 112 (measuring surface) for measurements is measured by a camera 113. Or, without using the screen for measurements, a two-dimensional light intensity distribution of the diffused light beams may be directly measured by a two-dimensional array sensor.

While the particles 60 are being driven to rotate, the wavefronts of light beams diffused by the particles 60 change and also the two-dimensional light intensity distribution on the measuring surface changes with time. Therefore, in the case where the operation of the particles 60 is above-described translational motion only, the movement of the two-dimensional light intensity distribution on the measuring surface is translational shift only. Accordingly the configuration of the diffusion wavefront itself does not change.

When the operation of the particles 60 is rotational motion, since the position and angle of the diffusion surface change due to rotation of each particle 60, that is, wavefronts from different parts of the diffusion surface, the configuration of the diffusion wavefront from the particle 60 itself changes. Therefore, by a measuring method such as shown in FIG. 36, it is relatively easy to detect whether the particles 60 in the screen 40 are rotating.

As explained in the above-described embodiment, by varying the voltage to the pair of electrodes 41 and 42, the particles 60 can be operated. And, by adjusting the variation range, center voltage, etc. of the application voltage, it is possible to control the repeated operation range of the particles 60, and the orientations and positions of the particles 60 at the center of the operation range.

To the above-described embodiment, it is possible to make a variety of changes. Hereinafter, with reference to the drawings, an example of modification will be explained. In the following explanation and the drawings to be used in the following explanation, the same signs as those to the corresponding elements in the above-described embodiment are used and the duplicate explanation is omitted.

Figure 8:
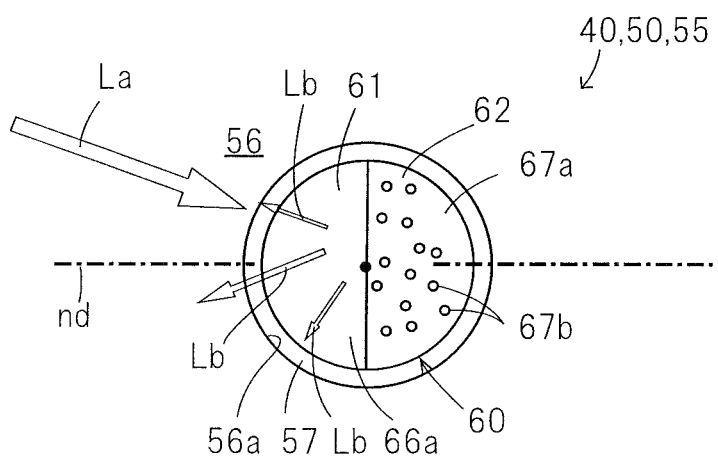
FIG. 8 is an illustration for showing an modification of the particle.

In the above-described embodiment, the example in which the first part 61 and the second part 62 have the same color is shown, however, the embodiment is not to be restricted to this example. Either of the first part 61 and the second part 62 may be transparent. In the particle 60 shown in FIG. 8, the first part 61 is formed to be transparent. The particle 60 shown in FIG. 8 is capable of changing the travel direction of a light beam incident on the particle 60 by reflection or refraction at the interface between the first part 61 and the second part 62, by diffusion at the second part 62, and by reflection or refraction at the surface of the particle 60. The color of such particle 60 can be perceived as the color of the second part 62 because the first part 61 is transparent. Therefore, even though the orientation, posture, and position of the particle 60 change, the screen 40 has a constant color. Accordingly, when displaying an image, there is no possibility that the tone of the screen 40 is perceived to change. As a result, it is possible to efficiently avoid image quality degradation in accordance with color change in the screen 40.

Figure 9:
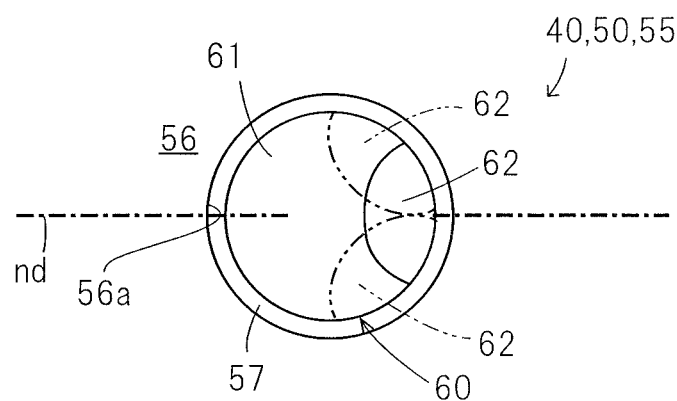
FIG. 9 is an illustration for showing another modification of the particle.
Figure 10:
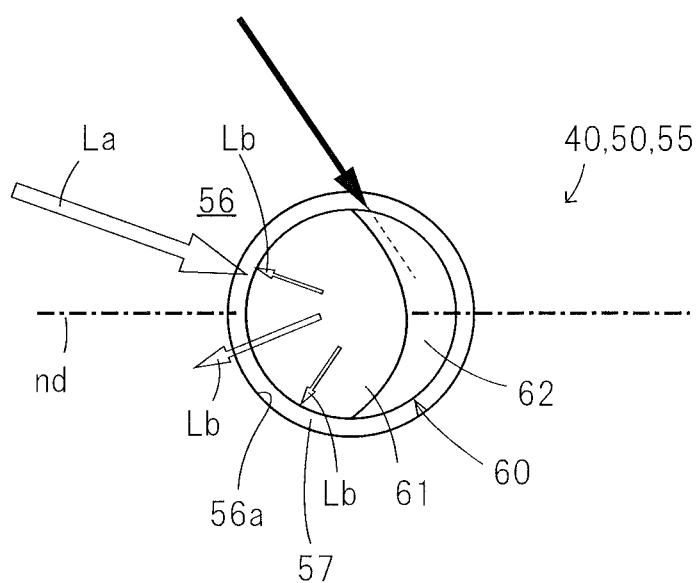
FIG. 10 is an illustration for showing still another modification of the particle.

The first part 61 and the second part 62 of the particle 60 may be, as shown in FIG. 9, different in volume ratio. In other words, the volume ratio of the first part 61 that occupies the particle 60 and the volume ratio of the second part 62 that occupies the particle 60 may be different from each other. In the particle 60 shown in FIG. 9, the volume ratio of the first part 61 is larger than the volume ratio of the second part 62. In the case of using such particle 60, while a light beam is being radiated onto the screen 40, it becomes easy for the first part 61 to cover at least part of the second part 62 when viewed from the observer's side along the direction of normal nd to the screen 40. Moreover, when the second part 62 shifts to the position indicated by a two-dot chain line along with the rotary motion of the particle 60, the first part 61 can cover the second part 62 when viewed from the observer's side along the direction of normal nd to the screen 40. Accordingly, even if the first part 61 and the second part 62 do not have exactly the same color, during image display while operating the particle 60, it is possible that the change in tone of the screen 40 is hardly perceived.

Moreover, in the case where, by drive control of the particle 60, the change in tone of the screen 40 can hardly be perceived without receiving a large effect of difference in color between the first part 61 and the second part 62, either of the first part 61 and the second part 62 may have a light absorbing function. In an example shown in FIG. 10, the first part 61 has the light diffusion characteristics while the second part 62 has the light absorbing function. The light absorbing function of the second part 62 can be developed when, as an example, the second part 62 includes a light-absorbing coloring material, specifically, a pigment such as carbon black and titan black. In the particle 60 shown in FIG. 10, a light beam Lc incident from a direction different from the direction of an image light beam La from the projector 20 can be absorbed by the second part 62. The light beam to be absorbed by the second part 62 may, for example, be an ambient light beam from an illumination apparatus 90 (refer to FIG. 1) present in the place where the display apparatus 10 is installed. By selecting and absorbing the light beam Lc except for the image light beam La incident on the screen 40, without loosing the brightness of a displayed image, it is possible to efficiently improve the contrast of the displayed image.

Second Embodiment

Figure 11:
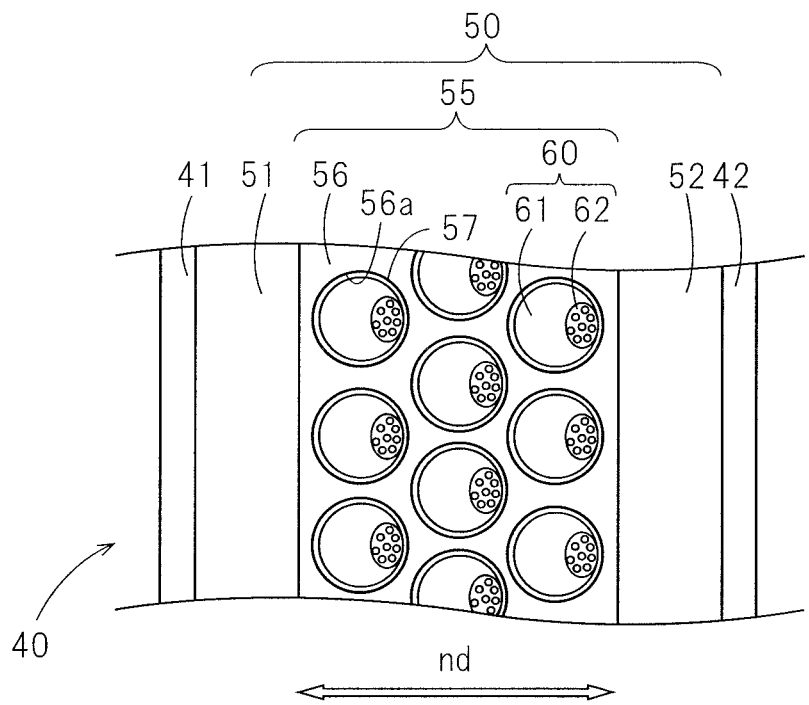
FIG. 11 is a longitudinal sectional view of a screen according to a second embodiment.
Figure 12:
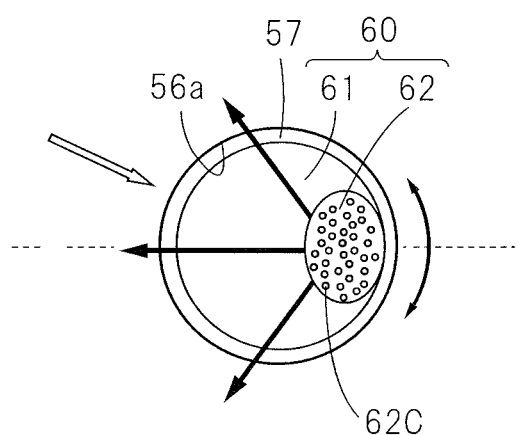
FIG. 12 is an illustration for explaining an operation of the screen according to the second embodiment.
Figure 13:
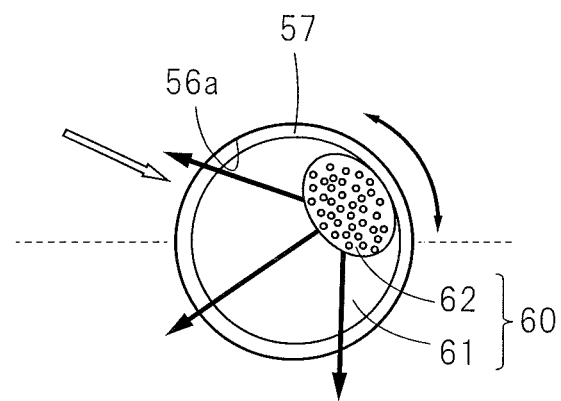
FIG. 13 is an illustration for explaining an operation of the screen according to the second embodiment.
Figure 14:
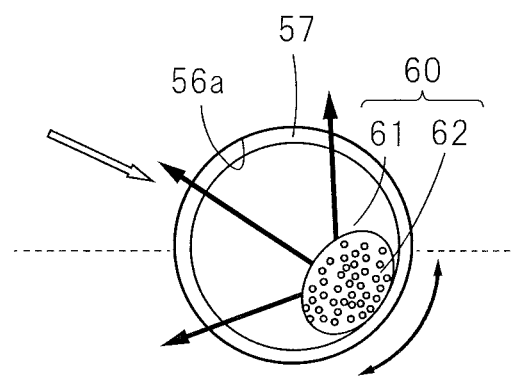
FIG. 14 is an illustration for explaining an operation of the screen according to the second embodiment.

FIGS. 11 to 14 are illustrations for explaining a second embodiment of the present disclosure. FIG. 11 is a longitudinal sectional view of a screen 40 according to the second embodiment. FIGS. 12 to 14 are illustrations for explaining an operation of the screen 40 of FIG. 11.

Like shown in FIG. 1, the display apparatus 10 according to the second embodiment has a projector 20 and a screen 40 to be irradiated with an image light beam from the projector 20. As described later, the screen 40 is capable of changing with time the diffusion characteristics that affect an incident light beam. In this way, speckles become inconspicuous. The projector 20 according to the second embodiment, like shown in FIG. 3, projects a coherent light beam onto the screen 40 in the raster scanning mode.

Subsequently, the screen 40 according to the second embodiment will be explained. In the example shown, the screen 40 has a particle sheet 50 having a plurality of particles 60, and transparent electrodes 41 and 42 disposed on both sides of the particle sheet 50 and connected to the power source 30. The first electrode 41 is spread in a planar shape over one main surface of the particle sheet 50. The second electrode 42 is spread in a planar shape over the other main surface of the particle sheet 50. Moreover, like in FIG. 1, the shown screen 40 has a first cover layer 46 that covers the first electrode 41 to form one outermost surface of the screen 40 and a second cover layer 47 that covers the second electrode 42 to form the other outermost surface of the screen 40.

Subsequently, the particle sheet 50 will be explained. As shown in FIG. 11, the particle sheet 50 has a pair of base members 51 and 52, and a particle layer 55 disposed between the pair of base members 51 and 52. The first base member 51 is joined to the first electrode 41. The second base member 52 is joined to the second electrode 42. The particle layer 55 is sealed between the first base member 51 and the second base member 52. The first base member 51 and the second base member 52 can be formed with a material having strength to be able to seal the particle layer 55 and having a function as a holder of the electrodes 41 and 42, and the particle layer 55, which is, for example, a polyethylene terephthalate resin film. In the embodiment shown, the screen 40 is a reflective-type screen 40 in which an image light beam passes through the first base member 51. Therefore, the first base member 51 is transparent and preferably has visible light transmittance at the same level as the first electrode 41 and the first cover layer 46.

Subsequently, the particle layer 55 will be explained. As shown well in FIG. 11, the particle layer 55 has a large number of particles 60 and a holder 56 for holding the particles 60. The holder 56 holds the particles 60 so as to be operable. In the example shown, the holder 56 has a large number of cavities 56a. Each particle 60 is accommodated in each cavity 56a. The inner size of each cavity 56a is larger than the outer size of the particle 60 in the cavity 56a. Therefore, the particle 60 is operable inside the cavity 56a. The holder 56 swells by a solvent 57, like shown in FIG. 2. Since the holder 56 and the solvent 57 are made of the same materials as those shown in FIG. 2, the detailed explanation is omitted.

The particle 60 according to the second embodiment is typically a sphere, provided with a first part 61 and a second part 62 having dielectric constants different from each other. The first part 61 is transparent and disposed at the observer's side. The first part 61 and the second part 62 are made contact with each other at a curved interface.

The volumes of the first part 61 and the second part 62 are different from each other. FIG. 11 shows an example in which the volume of the first part 61 is larger than the volume of the second part 62. In the case of FIG. 11, the second part 62 has a shape close to a sphere or an oval sphere. The surface of the second part 62, that is, the interface with the first part 61 is a convex surface. The particle 60 may not necessarily be an ideal sphere. The second part 62 may also have a shape that is a distorted version of the ideal sphere or oval sphere.

The first part 61 is a transparent member. As a specific material of the first part 61 is, for example, silicon oil and a transparent resin material. The first part 61 is, ideally, disposed on the observer' side as shown in FIG. 11. A light beam incident on the first part 61 passes therethough as it is and reaches the second part 62. The second part 62 is different from the first part 61 in dielectric constant and has a light scattering or reflection function. Moreover, the second part 62 is configured to have a refractive index different from that of the first part 61. Furthermore, inside the second part 62, as shown in FIG. 12, diffused components 62c, which diffuse a light beam, may be included. The diffused components 62c change the travel direction of a light beam that travels through the particle 60 by reflection, refraction, etc. Such a light diffusing function (light scattering function) of the diffused components 62c is given by, for example, forming the diffused components 62c by a material having a refractive index different from the material that constitutes the main part 62c of the particle 60 or by a material capable of exerting a reflection operation to a light beam. As the diffused components 62c having a refractive index different from the base material of the main part 62, resin beads, glass beads, a metal compound, a porous material containing a gas, and mere babbles are listed up as examples.

As described above, the first part 61 and the second part are different in optical characteristics. Moreover, the surface of the second part has a convex surface shape. Accordingly, the light beam that has reached the second part 62 from the first part 61 is scattered or reflected in a direction in accordance with the convex surface shape of the surface of the second part 62. Therefore, a projected light beam from the projector 20 is scattered or reflected by the second part 62 and then displayed on the screen 40.

Since the surface of the second part has a convex surface shape, the light beam that has passed the first part 61 to reach the surface of the second part 62 is scattered or reflected in a direction in accordance with the convex surface curvature. A light beam incident on a convex surface has a wider diffusion range than a light beam incident on a concave surface. Therefore, in such a case of the present embodiment, when the second part 62 has a smaller volume than the first part 61 and the surface of the second part 62 is a convex surface, it is possible to wider the diffusion range of a light beam incident on each particle 60.

In the state where no voltage is applied to the first and second electrodes 41 and 42, the particles 60 in the particle layer 55 may be oriented in a variety of directions. In this case, by applying a predetermined initial voltage between the first and second electrodes, as shown in FIG. 11, it is possible to align the particles 60 so that the first part 61 of each particle 60 is oriented in the observer's side. Or by adjusting specific gravity of the first part 61 and the second part 62, it is possible to align the particles 60 in the direction shown in FIG. 11.

In the state of FIG. 11, when a voltage is applied between the first and second electrodes 41 and 42, an electric field is generated between the first and second electrodes 41 and 42, and because of this electric field, an electron dipole moment is generated in each particle 60. In this occasion, the particle 60 operates toward a position at which a vector of the electron dipole moment is oriented in a direct opposite direction of a vector of the electric field. Therefore, when a voltage is applied between the first and second electrodes 41 and 42, and when an electric field is generated in the particle sheet 50 located between the first and second electrodes 41 and 42, the particles 60 operate in the cavities 56a in a posture stable to the electric field, that is, at the position and orientation stable to the electric field. In the state of FIG. 11, the second part 62 in each particle 60 is disposed to face the plane direction of the particle layer 55. However, the posture of the particle 60 changes by varying the voltage between the first and second electrodes 41 and 42, and, accordingly, the surface orientation of the second part 62 changes with respect to the plane direction of the particle layer 55. Since the second part 62 has a function of scattering or reflecting a light beam incident on the first part 61, when the surface orientation of the second part 62 changes, the incidence angle of a light beam incident on the surface of the second part 62 changes, the direction of scattering or reflection of the light beam on the second part 62 also changes. In this way, the diffusion characteristics of the screen 40 can be changed.

Also in the present embodiment, it is desirable that the rotation angle of each particle 60 is less than 180 degrees. In other words, it is desirable that, concerning the rotation angle of the particle 60, the particle 60 rotates by an angle of less than ±90 degrees with the initial posture of the particle 60 as a reference position. Accordingly, when the first part 61 faces the observer at the initial posture of the particle 60, even though the particle 60 is rotated, at least part of the first part 61 faces the observer, so that a most part of the light beam incident on the screen 40 from the projector 20 passes through the first part 61 and is guided to the second part 62, to be scattered or reflected. Therefore, projected light intensity on the screen 40 can be maintained at a high level.

The particles 60 each including the first part 61 and the second part 62 different in dielectric constant can be produced by a variety of methods including known techniques. The particles 60 can be produced by, for example, a method to align spherical particles of organic or inorganic matters in a single layer using an adhesive tape or the like, with deposition of a resin component layer or of an inorganic matter layer, to be charged with positive and negative electricity, different from sphere particles, on a hemisphere of each particle (a deposition method, for example, Japanese Patent Laid-Open No. S56-67887), a method using a rotary disc (for example, Japanese Patent Laid-Open No. H6-226875), a method to make contact two kinds of droplets different in dielectric constant with each other in air by a splaying method or an ink jet method to form a single droplet (for example, Japanese Patent Laid-Open No. 2003-140204), and a microchannel production method proposed in JP2004-197083A. As proposed in JP2004-197083A, the first part 61 and the second part 62 different in dielectric constant from each other can be formed using materials different in charging characteristics from each other.

When producing the particles 60 with the microchannel production method, by adjusting the speed, the joint direction, etc., in the case where two kinds of polymerizable resin components that constitute the continuous phase are joined to each other, and by adjusting the speed, the discharge direction, etc., in the case where the continuous phase is discharged into the spheroidizing phase, the outer shape of the obtained particles 60, the interface shape between the first part 61 and the second part 62 of each particle 60, etc. can be adjusted. In the example of the particle 60 shown in FIGS. 12 to 14, the volume of the first part 61 is larger than the volume of the second part 62. Moreover, in the example of the particle 60 shown in FIGS. 12 to 14, the interface at which the first part 61 and the second part 62 have surface contact with each other is formed to be a concave surface when viewed from the first part 61 and a convex surface when viewed from the second part 62. The second part 62 has a shape close to a sphere or an oval sphere.

Since the first part 61 of each particle 60 is transparent, the color of the second part 62 is viewed as the color of the particle 60. The color of the second part 62 of the particle 60 can be adjusted by a coloring material such as a pigment and a dye. As the pigment and the dye, a variety of known pigments and dyes can be used. As examples, pigments disclosed in JP2005-99158A and JP2780723B, pigments or dyes disclosed in JP5463911B can be used.

Subsequently, an operation in displaying an image using this display apparatus 10 will be explained. In the case of the particles 60 of FIG. 11, since the second part 62 is smaller than the first part 61 and the surface of the second part 62 is a convex surface, a light beam that has passed the first part 61 and then reached the second part 62 is scattered or reflected, that is, diffused in a relatively wide area depending on the convex surface curvature. Accordingly, the diffusion area of the particles 60 of FIG. 11 becomes wider. Therefore, not only for an observer situated just in front of the screen 40, but also for an observer situated obliquely a little bit, a diffused light beam from the screen 40 reaches, so that the viewing angle can be widened.

The screen 40 of the display apparatus 10 according to the present embodiment can change the diffusion characteristics with time by applying an alternating current voltage to the first and second electrodes 41 and 42 to rotate the particles 60. In more specifically, in the present embodiment, each particle 60 is rotated to change the orientation of the convex surface of the second part 62 of the particle 60 with time with respect to the direction of an incident light beam. In this way, the diffusion characteristics of the screen 40 change with time, and hence speckle patterns on the change with time. When the diffusion characteristics change with time at a sufficiently high speed, the speckle patterns are overlapped one another and averaged to be observed by the observer. As a result, speckles become inconspicuous.

The shown screen 40 has the pair of electrodes 41 and 42. When a voltage is applied between the pair of electrodes 41 and 42, an electric field is formed in the particle sheet 50 located between the pair of electrodes 41 and 42. The particle layer 55 of the particle sheet 50 holds the particles 60 so as to be operable, each including the first part 61 and the second part 62 different in dielectric constant. Since the particles 60 have been charged or when an electric field is formed in at least the particle layer 55, a dipole moment is generated, and hence the particles 60 operate in accordance with a vector of the formed electric field. When the particles 60 operate, which have a function of changing a light travel direction, such as, a reflection function and a diffusion function, as shown in FIGS. 12 to 14, the diffusion characteristics of the screen 40 change with time. As a result, speckles become inconspicuous.

Concerning the difference in dielectric constant between the first part 61 and the second part 62 of each particle 60, it is enough for the dielectric constants to be different to the extent that a speckle reducing function can be exerted. Therefore, whether the dielectric constants are different between the first part 61 and the second part 62 of the particle 60 can be determined by whether the particle 60 held so as to be operable can operate in accordance with the change in electric field vector.

The operating principle of the particles 60 to the holder 56 is to change the orientation and position of each particle 60 so that the electric charge or dipole moment of the particle 60 has a stable positional relationship with an electric field vector. Therefore, when a constant electric field is continuously applied to the particle layer 55, the operation of the particle 60 stops after a certain period of time. On the other hand, in order to make speckles inconspicuous, it is required that the operation of the particle 60 to the holder 56 continues. Accordingly, the power source 30 applies a voltage so that an electric field formed in the particle layer 55 varies with time. In the example shown, the power source 30 applies an alternating current voltage between the pair of the first and second electrodes 41 and 42 so as to invert the vector of an electric field generated in the particle sheet 50. For example, in the example shown in FIG. 7, the power source 30 repeatedly applies a voltage X[V] and a voltage −Y[V] to the pair of the first and second electrodes 41 and 42 of the screen 40. Together with such application of an inverted electric field, as an example, the particle 60 can repeatedly operate between the states of FIGS. 14 and 12 with the state of FIG. 13 as a center state. The voltage to be applied to the first and second electrodes 41 and 42 may not be limited to that shown in FIG. 7, which may, for example, be an alternating current voltage or the like.

As described above, the particles 60 are accommodated in the cavities 56a formed in the holder 56. In the example shown in FIGS. 12 to 14, each particle 60 has an almost sphere outer shape. Each cavity 56a that accommodates the particle 60 has an almost sphere inner shape. Therefore, the particle 60 can perform rotational vibration about its center axis line, as shown by arrow lines in FIGS. 12 to 14. Depending on the size of the cavity 56a that accommodates the particle 60, the particle 60 performs, not only the repeated rotational vibration, but also translational motion.

Moreover, the cavity 56*a* is filled with the solvent 57. The solvent 57 makes smooth the operation of the particle 60 to the holder 56.

As described above, in the second embodiment, the particles 60 of the particle layer 55 in the screen 40 are each configured to be a two-layer structure of the first part 61 and the second part 62 that has a smaller volume than the first part 61. The first part 61 is transparent while the second part 62 has the light scattering or reflecting characteristics. A light beam that has passed through the first part 61 to be incident on the interface with the second part 62 is diffused in a wide area at the convex surface of the second part 62. In this way, not only an observer situated just in front of the screen 40, but also an observer situated in an oblique direction can view an image light beam displayed on the screen 40, so that the viewing angle can be widened.

The first part 61 and the second part 62 of the particles 60 in the present embodiment are different in dielectric constant from each other. Therefore, the particles 60 can be rotated by arranging the first part 61 and the second part 62 on both sides of the particle layer 55 and applying an alternating current voltage between the first part 61 and the second part 62. Accordingly, the orientation of the convex surface of the second part 62 can be changed with time with respect to the direction of a light beam that passes through the first part 61 to be incident on the second part 62. Since the second part 62 has the light scattering or reflecting characteristics, the angle of scattering or reflection of the light beam incident on the second part 62 changes with time, and hence speckles are hardly viewed.

In order to repeatedly rotate each particle 60, it is preferable that its angle range is less than 180° as shown in FIGS. 12 to 14. In this case, the first part 61 can mainly be disposed at the observer's side. In other words, while a light beam is being radiated onto the screen 40, the first part 61 can be covered from the observer's side along the direction of normal nd to screen 40. Therefore, it is possible to guide a light beam, which has passed through the first part 61, to the second part 62 to scatter or reflect the light beam at the second part 62.

Moreover, since the first part 61 of each particle 60 is transparent, the color of the particle 60 is decided by the color of the second part 62. Therefore, even though the particle 60 performs rotary or translational motion, since the color of the second part 62 is always viewed, the tone of the screen 40 does not change.

Third Embodiment

The example shown in the second embodiment is that the second part 62 having a convex surface is provided in each particle 60 to widen the diffusing area. To the contrary, in the third embodiment, the shape of the second part 62 is changed to narrower the diffusing area.

Figure 15:
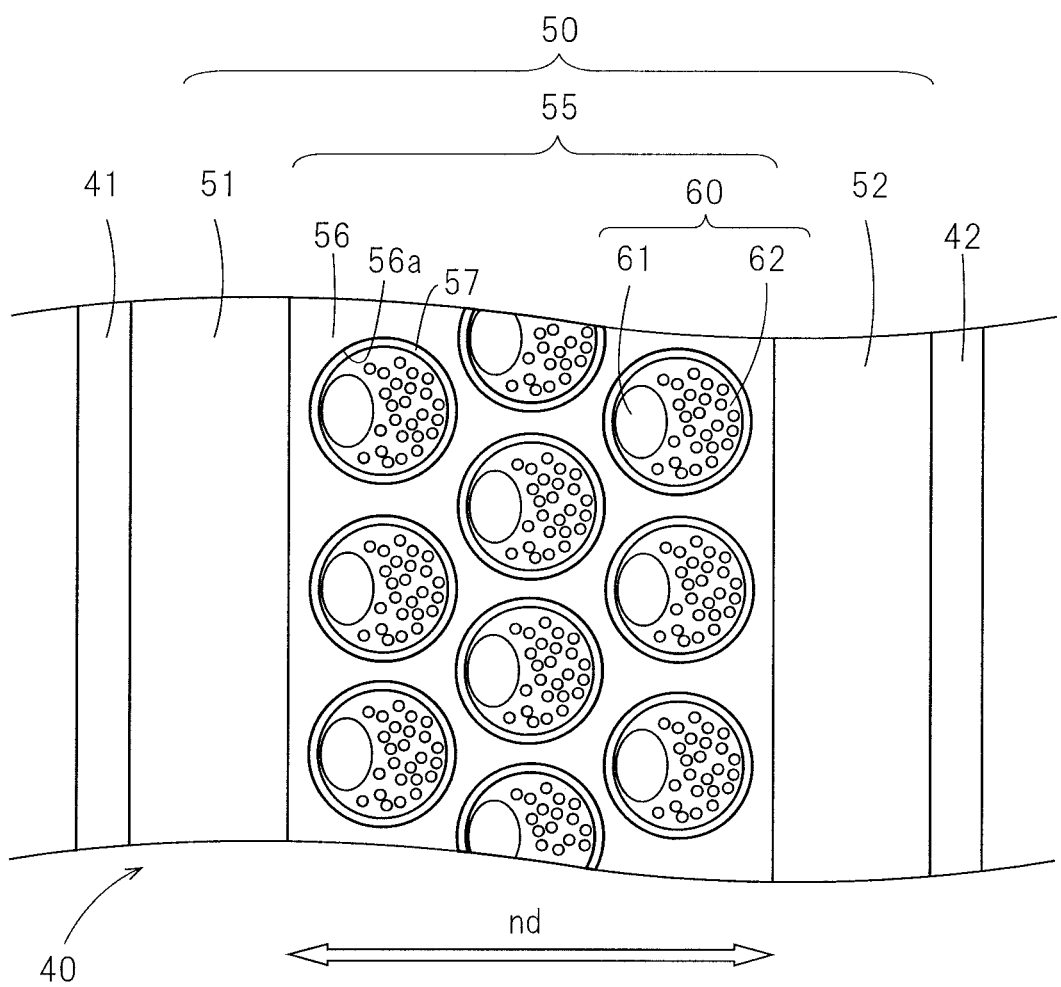
FIG. 15 is a longitudinal sectional view of a screen according to a third embodiment.
Figure 16:
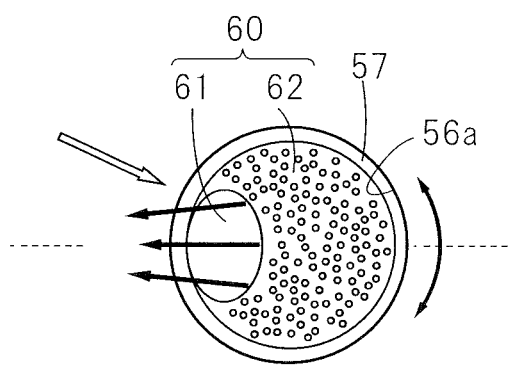
FIG. 16 is an illustration for explaining an operation of the screen according to the third embodiment.
Figure 17:
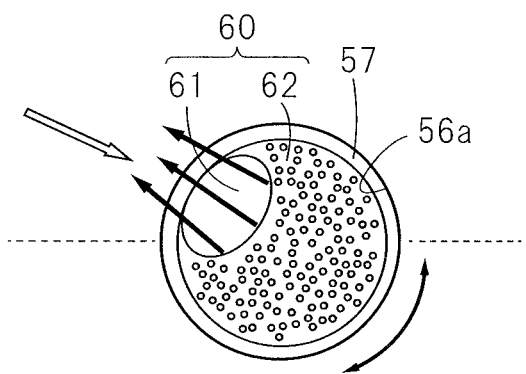
FIG. 17 is an illustration for explaining an operation of the screen according to the third embodiment.
Figure 18:
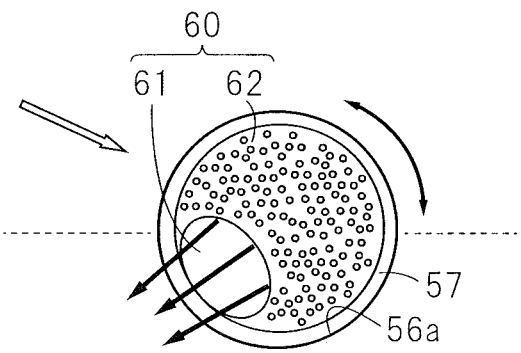
FIG. 18 is an illustration for explaining an operation of the screen according to the third embodiment.

FIGS. 15 to 18 are illustrations for explaining the third embodiment. FIG. 15 is a longitudinal sectional view of a screen 40. FIGS. 16 to 18 are illustrations for explaining an operation of the screen 40 of FIG. 15.

Particles 60 according to the third embodiment each have a first part 61 and a second part 62 having a larger volume than the first part 61. The materials of the first part 61 and the second part 62 are the same as those in the second embodiment. The first part 61 is a transparent member while the second part 62 has the light scattering or reflecting function.

The interface between the first part 61 and the second part 62 is a convex surface when viewed from the first part 61 and a concave surface when viewed from the second part 62. A light beam incident on the second part 62 from the first part 61 travels in the direction of convergence. Accordingly, the screen 40 having the particles 60 according to the present embodiment can diffuse a light beam in a narrow area. Therefore, it is possible to collect diffused light beams in concentrated manner to an observer situated in a specific position in front of the screen 40. Viewing from this observer, it is possible to view the screen 40 at high contrast.

As described, in the third embodiment, each particle 60 in the particle layer 55 of the screen 40 narrows the diffusing area of an image light beam from the projector 20. Therefore, an observer situated in a specific position can view a projected image on the screen 40 at higher contrast.

In the above-described first to third embodiments, although the explanation has been made about the reflective-type screen 40, these embodiments are also applicable to a transparent-type screen 40. In the case of the transparent-type screen 40, it is required that a light beam from the projector 20 passes through the particles 60. Because of this, for example, the volume of the second part 62 may be made much smaller with respect to the first part 61 to reduce the percentage of light that passes through the first part 61 to be incident on the second part 62. Or particles 60 having second parts 62 and particles 60 with no second parts 62 may coexist. In the case of the transparent-type screen 40, it is desirable that the volume ratio of the first part 61 and the second part 62 in each particle 60 is adjusted so that light transmittance becomes higher than light reflectance in the entire particle layer 55.

Fourth Embodiment

The screen according to the fourth embodiment is different in particles 60 from the screens according to the above-described first to third embodiments. The particles 60 in the fourth embodiment are configured to show higher reflectance to a light beam in the wavelength range of a coherent light beam oscillated by the coherent light source 21 than to a light beam outside the wavelength range of the coherent light beam.

Diffused components 66*b* and 67*b*, which are included in each particle 60 according to the present embodiment, include a pigment that selectively scatters a light beam in the wavelength range of a coherent light beam oscillated by the coherent light source 21. Or a pigment or a dye, which absorbs a light beam outside the wavelength range of the coherent light beam oscillated by the coherent light source 21, may be added to the main parts 66*a* and 67*a* of the particle 60. As the pigment or dye, a color filter pigment disclosed in JP2780723B and a color filter dye disclosed in JP5463911B can be listed up as examples. Because of the pigment or dye, which absorbs a light beam outside the wavelength range of the coherent light beam, being added to the main parts 66*a* and 67*a* of the particle 60, a light beam outside the wavelength range of the coherent light beam but in a wavelength of an ambient light beam such as an external light beam and an illumination light beam, is not scattered but absorbed in the particle 60. Accordingly, the effect of the ambient light beam to an image light beam is reduced to make it possible to display a high contrast image. In this case, the diffused components 66*b* and 67*b* of the particle 60 may be configured with a pigment that selectively scatters a light beam in the wavelength range of the coherent light beam oscillated by the coherent light source 21 or may be configured with a material, such as resin beads, glass beads, a metal compound, a porous material containing a gas, and mere babbles, having a refractive index different from that of the materials that constitute the main parts 66a and 67a of the particle 60.

A conventional screen reflects an ambient light beam such as an external light beam and an illumination light beam without distinguishing between the ambient light beam and an image light beam. This results in a small difference in brightness between a part irradiated with the image light beam and a part not irradiated with the image light beam. Therefore, in order to achieve high-contrast image display in the conventional screen, it is required to suppress the effect of an ambient light beam such as an external light beam and an illumination light beam using a means or an environment for making a room dark.

To the contrary, in the screen 40 of the display apparatus 10 in the present embodiment, the particles 60 included in the particle layer 55 are configured to show higher reflectance to a light beam in the wavelength range of a coherent light beam oscillated by the coherent light source 21 than to a light beam outside the wavelength range of the coherent light beam. Therefore, it is restricted that a light beam of a wavelength, which is outside the wavelength range of the coherent light beam but in a wavelength of an ambient light beam such as an external light and an illumination light, is scattered on the screen 40. Accordingly, the effect of the ambient light beam to an image light beam can be reduced, and hence a high-contrast image can be displayed even in a bright environment.

Moreover, according to the present embodiment, each particle 60 included in the particle layer 55 is configured to show higher reflectance to a light beam in the wavelength range of a coherent light beam oscillating from the coherent light source 21 than to a light beam outside the wavelength range of the coherent light beam. Therefore, it is restricted that a light beam of a wavelength, which is outside the wavelength range of the coherent light beam but in a wavelength of an ambient light beam such as an external light and an illumination light, is scattered on the screen 40. Accordingly, the effect of the ambient light beam to an image light beam can be reduced, and hence a high-contrast image can be displayed even in a bright environment.

The example shown in the above-described embodiment is that the diffused components 66b and 67b included in the particle 60 are configured with a pigment that selectively scatters a light beam in the wavelength range of a coherent light beam oscillated by the coherent light source 21. Not to be limited to the example, for example, a pigment or a dye, which absorbs a light beam outside the wavelength range of the coherent light beam oscillated by the coherent light source 21, may be added to the main parts 66a and 67a of the particle 60. As the pigment or dye, a color filter pigment disclosed in JP2780723B and a color filter dye disclosed in JP5463911B can be listed up as examples. Because of the pigment or dye, which absorbs a light beam outside the wavelength range of the coherent light beam, being added to the main parts 66b and 67b of the particle 60, a light beam outside the wavelength range of the coherent light beam, in a wavelength of an ambient light beam such as an external light beam and an illumination light beam, is not scattered but absorbed in the particle 60. Accordingly, the effect of the ambient light beam to an image light beam is reduced to make it possible to display a high contrast image. In this case, the diffused components 66b and 67b of the particle 60 may be configured with a pigment that selectively scatters a light beam in the wavelength range of the coherent light beam oscillated by the coherent light source 21 or may be configured with a material, such as resin beads, glass beads, a metal compound, a porous material containing a gas, and mere babbles, having a refractive index different from that of the materials that constitute the main parts 66b and 67b of the particle 60.

Or a pigment or a dye, which absorbs a light beam outside the wavelength range of the coherent light beam, may be added to the holder 56 made of silicon rubber or the like. Moreover, as long as the function of the screen 40 is not obstructed, a pigment or a dye, which absorbs a light beam outside the wavelength range of the coherent light beam, may be added to the electrodes 41 and 42, the cover layers 46 and 47, the base members 51 and 52, and a layer of an adhesive or the like that joins these components, of the screen 40. Furthermore, a layer, having a function of absorbing a light beam outside the wavelength range of the coherent light beam oscillated by the coherent light source 21, may be provided to the screen 40. By means of these examples, in the same manner as in the case where a pigment or a dye, which absorbs a light beam outside the wavelength range of the coherent light beam, is added to the main parts 66a and 67a of the particle 60, the effect of the ambient light beam to an image light beam is reduced to make it possible to display a high contrast image.

When the screen 40 is a reflective type, a layer, having a function of absorbing a light beam, which is outside the wavelength range of the coherent light beam, from a light beam incident on the particle layer 55 and a light beam reflected on the particle layer 55, is disposed on the observer's side rather than on the particle layer 55's side.

To the contrary, when the screen 40 is a reflective type, a layer, having a function of absorbing a light beam outside the wavelength range of the coherent light beam, can be disposed at any position in the screen 40, that is, between the particle layer 55 and the first base member 51 or the second base member 52, between the first base member 51 and the first electrode 41 or between the second base member 52 and the second electrode 42, and between the first electrode 41 and the first cover layer 46 or between the second electrode 42 and the second cover layer 47. However, from the point of view of restricting reflection of an ambient light beam outside the wavelength range of the coherent light beam, it is preferable that the layer, having a function of absorbing a light beam outside the wavelength range of the coherent light beam, is disposed at a position closer to the observer' side. In this case, improvement in contrast can be achieved more effectively.

Figure 19:
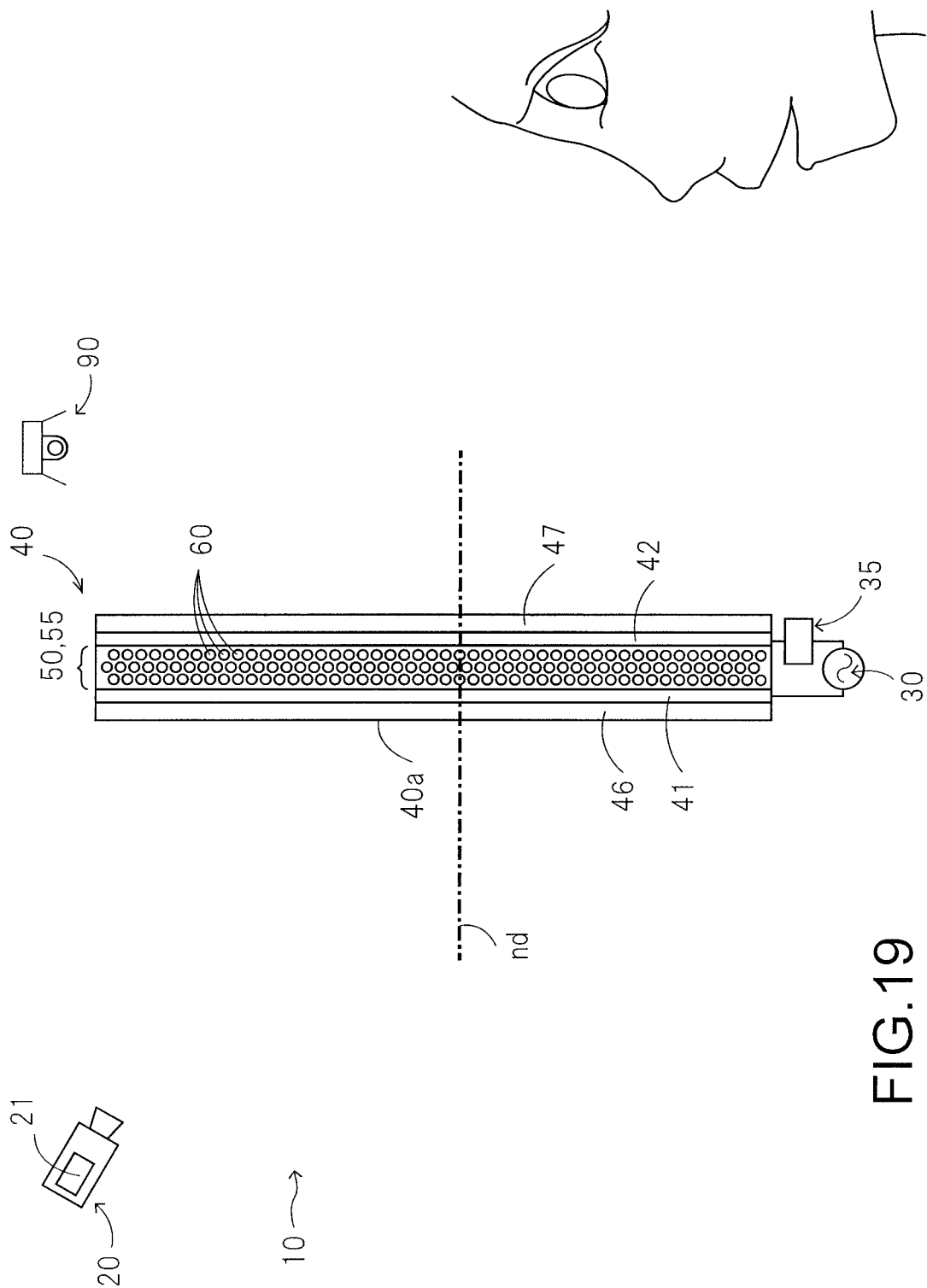
FIG. 19 is an illustration for explaining a fourth embodiment and is a sectional view showing a transparent-type display apparatus.

The example shown in the above-mentioned embodiment is that the screen 40 is a reflection-type screen. Not only limited to this example, as shown in FIG. 19, the screen 40 may be a transmission-type screen. In this case, each particle 60 included in the particle layer 55 is configured to show higher reflectance to a light beam in the wavelength range of a coherent light beam oscillated by the coherent light source 21 than to a light beam outside the wavelength range of the coherent light beam. Therefore, it is restricted that a light beam of a wavelength, which is outside the wavelength range of the coherent light beam but in a wavelength of an ambient light beam such as an external light and an illumination light, passes through the screen 40. Accordingly, an observer situated to face a surface of the screen 40 opposite to the display-side surface 40a can observe a high-contrast image even in a bright environment. In the transmission-type screen 40, the second electrode 42, the second cover layer 47, and the second base member 52 are configured to be transparent in the same manner as the first electrode 41, the first cover layer 46, and the first base member 51, and preferably have the same visible light transmittance as the above-described first electrode 41, first cover layer 46, and first base member 51. Moreover, it is preferable that the quantities of the diffused components 66b and 67b added in the particle 60 are adjusted so that transmittance to a light beam incident on the particle 60 is higher than reflectance to the light beam.

Fifth Embodiment

Figure 20:
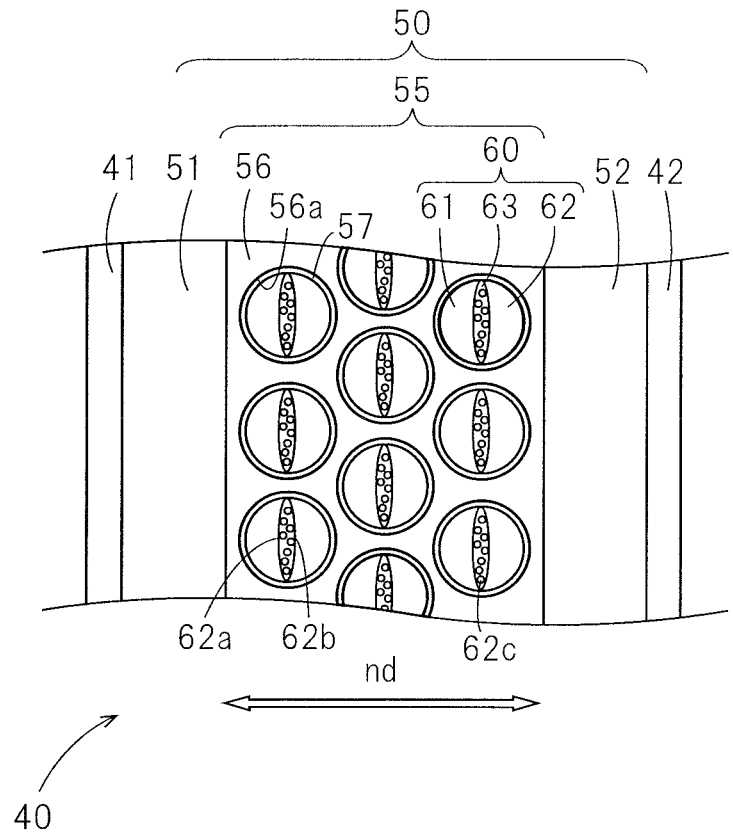
FIG. 20 is a longitudinal sectional view of a screen according to a fifth embodiment.
Figure 21:
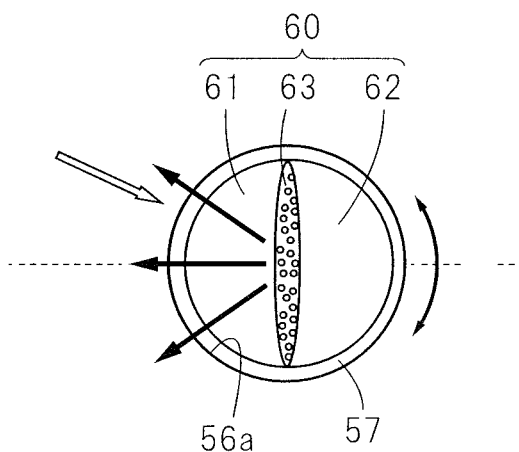
FIG. 21 is an illustration for explaining an operation of the screen according to the fifth embodiment.
Figure 22:
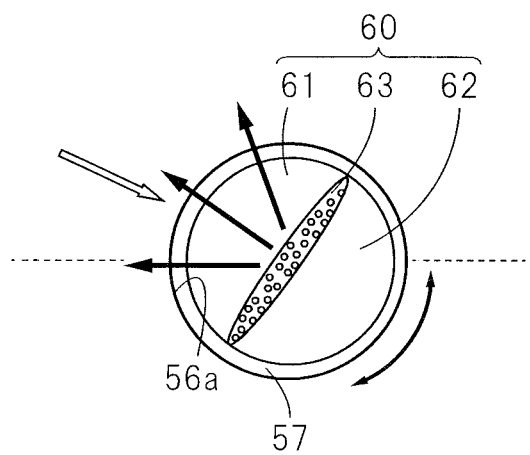
FIG. 22 is an illustration for explaining an operation of the screen according to the fifth embodiment.
Figure 23:
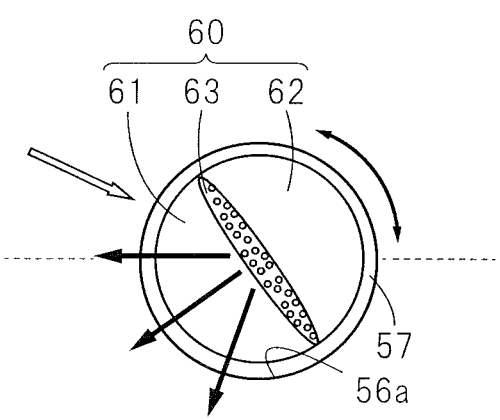
FIG. 23 is an illustration for explaining an operation of the screen according to the fifth embodiment.

FIGS. 20 to 23 are illustrations for explaining a fifth embodiment of the present disclosure. A display apparatus 1 according to the fifth embodiment has the same configuration as that of FIG. 1. FIG. 20 is a longitudinal sectional view of a screen 40 according to the fifth embodiment. FIGS. 21 to 23 are illustrations for explaining an operation of the screen 40 of FIG. 1.

The display apparatus 10 according to the fifth embodiment, like shown in FIG. 1, has a projector 20 and a screen 40 to be irradiated with an image light beam from the projector 20. As shown in FIG. 20, the screen 40 has a particle sheet 50 having a plurality of particles, and transparent electrodes 41 and 42 connected to the power source 30 and disposed on both sides of the particle sheet 50.

The particle sheet 50 has a pair of base members 51 and 52, and a particle layer 55 disposed between the pair of base members 51 and 52. The particle layer 55 has a large number of particles 60 and a holder 56 for holding the particles 60. The holder 56 holds the particles 60 so as to be operable. The particles 60 have a function of changing the travel direction of an image light beam projected from the projector 20. In the example shown, the particles 60 have a function of diffusing the image light beam by diffuse reflection.

The particles 60 each have a three-layer structure in which a first part 61, a third part 63, and a second part 62 are aligned in this order, among which the first part 61 is disposed on the observer's side. The third part 63 is in surface contact with the first part 61, to control an incident light beam from the first part 61. The second part 62 is in surface contact with a second face 63b of the third part 63, which is opposite to a first face 63a of the third part 63, which is in surface contact with the first part 61, the second part 62 being different in dielectric constant from the first part 61. The third part 63 is sandwiched between the first part 61 and the second part 62, to be in surface contact with the first part 61 and with the second part 62.

The first part 61 and the second part 62 are transparent members. The third part 63 has a function of scattering or reflecting a light beam incident on the first part 61. The third part 63 is configured to have a refractive index different from that of the first part 61. Furthermore, inside the third part 63, diffused components 63c for diffusing a light beam may be included. These diffused components 63c change the travel direction of a light beam that travels through the particle 60 by reflection, refraction, etc. Such a light diffusing function (light scattering function) of the diffused components 63c is given by, for example, forming the diffused components 63c with a material having a refractive index different from that of the material that constitutes the main part 63c of the particle 60 or with a material capable of exerting a reflection operation to a light beam. As the diffused components 63c having a refractive index different from that of the base material of the main part 63, resin beads, glass beads, a metal compound, a porous material containing a gas, and mere babbles are listed up as examples.

The particle 60 is typically a sphere, in which a thin layer passing through its center area is the third part 63, with the first part 61 and the second part 62 made in surface contact on both sides (the first face 63a and the second face 63b) of the third part 63. The particle 60 may not necessarily be an ideal sphere. Therefore, the shapes of the first part 61, the third part 63, and the second part 62 change depending on the shape of the particle 60.

The thickness between the first face 63a and the second face 63b of the third part 63 of the particle 60 is thinner than a maximum thickness of the first face 63a of the first part 61 in the direction of normal to the first face 63a. The thickness between the first face 63a and the second face 63b of the third part 63 of the particle 60 is thinner than a maximum thickness of the second face 63b of the third part 63 in the direction of normal to the second face 63b. The first face 63a and the second face 63b have, for example, a circular shape or an oval shape and the third part 63 has, for example, a circular, oval, cylindrical or elliptic cylindrical shape.

In an initial state where no voltage is applied to the first and second electrodes 41 and 42, the plane direction of the third part 63 is oriented almost parallel to the plane direction of the particle layer 55. In the initial state, the plane direction of the third part 63 can be oriented almost parallel to the plane direction of the particle layer 55, for example, by adjusting the specific gravity of the first part 61, the second part 62, and the third part 63 of each particle 60. Or the plane direction of the third part 63 may be oriented almost parallel to the plane direction of the particle layer 55, for example, by applying a predetermined initial voltage to the first and second electrodes 41 and 42 in the initial state.

When a voltage is applied between the first and second electrodes 41 and 42, an electric field is generated between the first and second electrodes 41 and 42, and because of this electric field, an electron dipole moment is generated in each particle 60. In this occasion, the particle 60 operates toward a position at which a vector of the electron dipole moment is oriented in the direct opposite direction of a vector of the electric field. Therefore, when a voltage is applied between the first and second electrodes 41 and 42, and an electric field is generated in the particle sheet 50 located between the first and second electrodes 41 and 42, the particles 60 operate in the cavities 56a in a posture stable to the electric field, that is, at the position and orientation stable to the electric field. The posture of each particle 60 changes by varying the voltage between the first and second electrodes 41 and 42, and, accordingly, the angle of the surface orientation of the third part 63 changes with respect to the plane direction of the particle layer 55. Since the third part 63 has a function of scattering or reflecting a light beam incident on the first part 61, when the angle of the third part 63 changes, the diffusion characteristics of the screen 40 can be changed.

It is desirable that the rotation angle of each particle 60 is less than 180 degrees. In other words, it is desirable that, concerning the rotation angle of the particle 60, the particle 60 rotates by an angle of less than ±90 degrees with the initial posture of the particle 60 as a reference position. Accordingly, when the first part 61 faces the observer at the initial posture of the particle 60, even though the particle 60 is rotated, at least part of the first part 61 faces the observer, so that a most part of the light beam incident on the screen 40 from the projector passes through the first part 61 and is guided to the third part 63, to be scattered or reflected. Therefore, projected light intensity on the screen 40 can be maintained at a high level.

The particles 60 each including the first part 61, the third part 63, and the second part 62 different in dielectric constant can be produced by a variety of methods including known techniques. The particles 60 can be produced by, for example, a method to align spherical particles of organic or inorganic matters in a single layer using an adhesive tape or the like, with deposition of a resin component layer or of an inorganic matter layer, to be charged with positive and negative electricity, different from sphere particles, on a hemisphere of each particle (a deposition method, for example, Japanese Patent Laid-Open No. S56-67887), a method using a rotary disc (for example, Japanese Patent Laid-Open No. H6-226875), a method to make two kinds of droplets of different dielectric constants in contact with each other in air by a splaying method or an ink jet method to from a single droplet (for example, Japanese Patent Laid-Open No. 2003-140204), and a microchannel production method proposed in JP2004-197083A. As proposed in JP2004-197083A, the first part 61, the second part 62, and the third part 63 different in dielectric constant from one another can be formed with materials different in charging characteristics from one another. The third part 63 can be formed using a scattering material or light reflection flakes. A light reflection flame is formed by, for example, mixing flakes into which a reflection material is finely crushed, into a base material of the third part 63.

The microchannel production method is to use a continuous phase and a spheroidizing phase having an oily/aqueous (O/W type) or aqueous/oily (W/O type) relationship and to sequentially discharge a continuous phase including materials corresponding to the first part 61, the second part 62, and the third part 63 from a first microchannel, through which the continuous phase is transferred, into the spheroidizing phase of a fluid medium which flows through a second microchannel, thereby producing bipolar particles 60 that are three-layer polymer particles 60 and have polarities of (±) in charge.

When producing the particles 60 with the microchannel production method, by adjusting the speed, the joint direction, etc., in the case where the three kinds of polymerizable resin components that constitute the continuous phase are joined to each other, and by adjusting the speed, the discharge direction, etc., in the case where the continuous phase is discharged into the spheroidizing phase, the outer shape of the obtained particles 60, the interface shape between the first part 61, the second part 62, and the third part 63 of each particle 60, etc. can be adjusted. In the example of the particle 60 shown in FIGS. 21 to 23, the volume ratio of the first part 61 and the volume ratio of the second part 62 are the same as each other. Moreover, in the example of the particle 60 shown in FIGS. 21 to 23, the first face 63a on which the first part 61 and the second part 62 are made in surface contact with each other and the second face 63b on which the third part 63 and the second part 62 are made in surface contact with each other are formed into a circular or oval shape. And the particle 60 shown in FIGS. 21 to 23 is a sphere. That is, in the particle 60 shown in FIGS. 21 to 23, the first part 61 and the second part 62 are each a hemisphere and the third part 63 is disc like. However, as described above, the third part 63 may have a few thickness and the shape of the particle 60 may not be an ideal sphere.

Since the first part 61 and the second part 62 of each particle 60 is transparent, the color of the third part 63 is viewed as the color of the particle 60. The color of the third part 63 of the article 60 can be adjusted by a coloring material such as a pigment and a dye. As the pigment and the dye, a variety of known pigments and dyes can be used. As examples, pigments disclosed in JP2005-99158A and JP2780723B, pigments or dyes disclosed in JP5463911B can be used.

Subsequently, an operation in displaying an image using this display apparatus 10 will be explained.

A light beam projected onto the screen 40 passes through the first cover layer 46 and the first electrode 41, and then reaches the particle sheet 50. The light beam is reflected on the third part 63 of the particle 60 of the particle sheet 50 by diffuse reflection and emitted toward several directions in the observer's side of the screen 40. Therefore, at respective points in the observer's side of the screen 40, reflected light beams from respective points on the screen 40 can be observed. As a result, an image corresponding to an area irradiated with the coherent light beams on the screen 40 can be observed.

The light source 21 may include a plurality of light sources that emit coherent light beams of wavelengths different from one another. In the case, the controller 35 controls a light source corresponding to a light beam of each wavelength independently from the other light sources. As a result, it is possible to display an color image on the screen 40.

The screen 40 of the display apparatus 10 according to the present embodiment changes the diffusion characteristics with time by rotating the particles 60. In more detail, in the present embodiment, the inclination angle of the third part 63 of each particle 60 to the direction of an incident light is changed with time. Accordingly, the diffusion characteristics of the screen 40 change with time, so that speckle patterns on the screen 40 change with time. When the diffusion characteristics change with time at a sufficiently high speed, the speckle patterns are overlapped one another and averaged to be observed by the observer. As a result, speckles become inconspicuous.

The shown screen 40 has a pair of electrodes 41 and 42. When a voltage is applied between the pair of electrodes 41 and 42, an electric field is formed in the particle sheet 50 located between the pair of electrodes 41 and 42. The particle layer 55 of the particle sheet 50 holds the particles 60 so as to be operable, each including the first part 61 and the second part 62 different in dielectric constant. Since the particles 60 have been charged or when an electric field is formed in at least the particle layer 55, a dipole moment is generated, and hence the particles 60 operate in accordance with a vector of the formed electric field. When the particles 60 operate, which have a function of changing a light travel direction, such as, a reflection function and a diffusion function, as shown in FIGS. 21 to 23, the diffusion characteristics of the screen 40 change with time. As a result, speckles become inconspicuous.

Concerning the difference in dielectric constants between the first part 61 and the second part 62 of each particle 60, it is enough for the dielectric constants to be different to the extent that a speckle reducing function can be exerted. Therefore, whether the dielectric constants between the first part 61 and the second part 62 of the particle 60 are different from each other can be determined by whether the particle 60 held so as to be operable can operate in accordance with the change in electric field vector.

The operating principle of the particles 60 to the holder 56 is to change the orientation and position of each particle 60 so that the electric charge or dipole moment of the particle 60 has a stable positional relationship with an electric field vector. Therefore, when a constant electric field is continuously applied to the particle layer 55, the operation of the particle 60 stops after a certain period of time. On the other hand, in order to make speckles inconspicuous, it is required that the operation of the particle 60 to the holder 56 continues. Accordingly, the power source 30 applies a voltage so that an electric field formed in the particle layer 55 varies with time. In the example shown, the power source 30 applies an alternating current voltage between the pair of electrodes 41 and 42 so as to invert the vector of an electric field generated in the particle sheet 50. For example, in the example shown in FIG. 7, the power source 30 repeatedly applies a voltage X[V] and a voltage −Y[V] to the pair of electrodes 41 and 42. Together with such application of an inverted electric field, as an example, the particle 60 can repeatedly operate between the states of FIGS. 23 and 21 with the state of FIG. 22 as a center state. The voltage to be applied to the first and second electrodes 41 and 42 may not be limited to that shown in FIG. 7, which may, for example, be an alternating current voltage or the like.

As described above, the particles 60 are accommodated in the cavities 56a formed in the holder 56. In the example shown in FIGS. 21 to 23, each particle 60 has an almost sphere outer shape. Each cavity 56a that accommodates the particle 60 has an almost sphere inner shape. Therefore, the particle 60 can perform rotational vibration about a rotation axis line passing its center, as shown by an arrow line in FIGS. 21 to 23. Depending on the size of the cavity 56a that accommodates the particle 60, the particle 60 performs, not only the repeated rotational vibration, but also translational motion. Moreover, the cavity 56a is filled with the solvent 57. The solvent 57 makes smooth the operation of the particle 60 to the holder 56.

As described above, in the fifth embodiment, the particles 60 of the particle layer 55 in the screen 40 each have a three-layer structure of the first part 61, the second part 62, and the third part 63. The first part 61 and the second part 62 are transparent and different in dielectric constant from each other. The third part 63 is disposed between the first part 61 and the second part 62, having a light scattering or reflecting function. Since the first part 61 and the second part 62 of each particle 60 are transparent, the color of the particle 60 is decided by the color of the third part 63. Therefore, even though the particle 60 performs rotary or translational motion, the color of the particle 60 does not change and hence the color of the screen 40 does not change. Since the third part 63 has the light scattering or reflecting function, a light beam incident on the first part 61 of the particle 60 can be scattered or reflected by the third part 63.

On both sides of the particle layer 55 including such particles 60, when the first and second electrodes 41 and 42 are arranged and an alternating current voltage is applied therebetween, the inclination angle of the third part 63 in the plane direction with respect to the direction of an incident light can be changed with time. Since the third part 63 has the light scattering or reflecting function, the scattering or reflecting angle of a light beam incident on the third part 63 changes with time and hence speckles become inconspicuous.

Furthermore, according to the present embodiment, while a light beam is being radiated onto the screen 40, the particles 60 can be repeatedly rotated in the particle layer 55. In other words, the particles 60 can operate to effectively change the diffusion characteristics in an extremely small space. Therefore, by repeatedly rotating the particles 60, while realizing a thin particle layer 55 and a thin screen 40, speckles can effectively be made inconspicuous. When repeatedly rotating each particle 60, its angular range is preferably less than 180° as shown in FIGS. 21 to 23. In this case, the first part 61 and the third part 63 can mainly be situated on the observer's side. In other words, while a light beam is being radiated onto the screen 40, it is possible that the first part 61 covers the third part 63 when viewed from the observer's side along the direction of normal nd to the screen 40. Accordingly, it is possible to guide a light beam that has passed the first part 61 to the third part 63 to scatter or reflect the light beam at the third part 63.

Sixth Embodiment

The example explained in the fifth embodiment is about the reflective-type screen 40, while an example shown in the sixth embodiment is about an application to a transparent-type screen 40.

Figure 24:
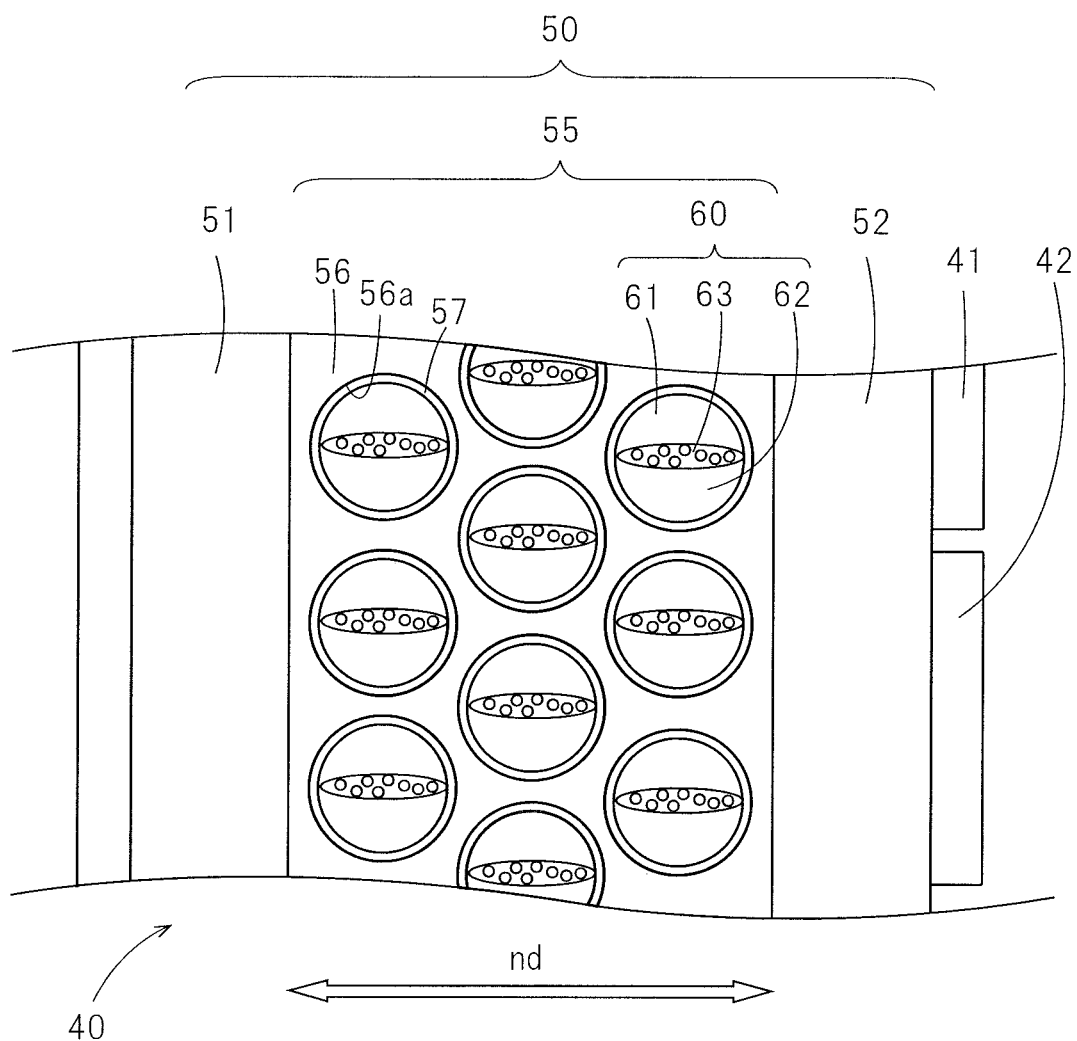
FIG. 24 is a longitudinal sectional view of a screen according to a sixth embodiment.

FIG. 24 is a longitudinal sectional view of a screen 40 according to the sixth embodiment. The screen 40 according to the sixth embodiment is a transparent type. The screen 40 of FIG. 24 is different from the screen 40 of FIG. 20 in orientation of the particles 60 in the particle layer 55. The particles 60 according to the sixth embodiment have a three-layer structure of the first part 61, the second part 62 and the third part 63, like the fifth embodiment, the material of each part being the same as that in the fifth embodiment.

The particles 60 of FIG. 24 have a reference posture, which corresponds to the posture of the particles 60 of FIG. 20 rotated by 90 degrees, and are capable of rotating by 90 degrees in both directions from the reference posture. In order to rotate the particles 60 of FIG. 24, it is required to apply an electric field in the particle layer 55 in a direction different from the direction in FIG. 20 by 90 degrees. Accordingly, in the present embodiment, first electrodes 41 and second electrodes 42 are alternately arranged in a stripe pattern only on one side opposite to the observer and an electric field is formed in the plane direction of the particle layer 55 by the electrodes 41 and 42, that is, in a direction different from the direction in FIG. 20 by 90 degrees. In more specifically, in the present embodiment, an alternating current voltage is applied between the first electrode 41 and the second electrode 42 adjacent to each other to cyclically switch the electric field formed in the plane direction of the particle layer 55. In this way, the particles 60 situated in the vicinity of the associated first electrode 41 and second electrode 42 rotate in accordance with the frequency of the alternating current voltage.

The screen 40 of FIG. 24 is in the initial state where no voltage is applied to the first electrode 41 and the second electrode 42, so that the plane direction of the third part 63 of each particle 60 in the particle layer 55 is oriented almost parallel to the direction of normal to the particle layer 55. Since the third part 63 is very thin, the most part of a light beam incident on the screen 40 pass through the first part 61 and the second part 62 of each particle 60. Therefore, an observer situated to face a surface of the screen 40, opposite to the surface thereof on which a light beam from the projector 20 is incident, can view a projected light beam from the projector 20.

In the initial state where no voltage is applied to the first electrode 41 and the second electrode 42, in order to orient the plane direction of the third part 63 parallel to the direction of normal to the particle layer 55, it can be considered to adjust the specific gravity of the first part 61, the second part 62, and the third part 63 in the particle 60. Or a predetermined initial voltage may be applied between the first electrode and the second electrode to orient the plane direction of the third part 63 of each particle 60 in the direction of normal to the particle layer 55.

When an alternating current voltage is applied to the first electrode 41 and the second electrode 42, the particles 60 rotate, so that the inclination angle of the third part 63 of the particle 60 to the direction of an incident light changes with time. Therefore, the direction of a light beam scattered or reflected by the third part 63 changes with time and hence speckles are hardly viewed.

As described above, in the sixth embodiment, the transparent-type screen 40 can be realized by setting the state of the particles 60, which are rotated in a direction different from that of the fifth embodiment by 90 degrees, to the reference posture of the particles 60. Moreover, by rotating each particle 60 within a range less than 180 degrees from the reference posture, speckles on the screen 40 become inconspicuous.

Seventh Embodiment

The examples explained in the first to sixth embodiments are about applications to the reflective- or transmission-type screen 40, while an example shown in the seventh embodiment is about an application to a light control sheet such as a window and a lighting film.

Figure 25:
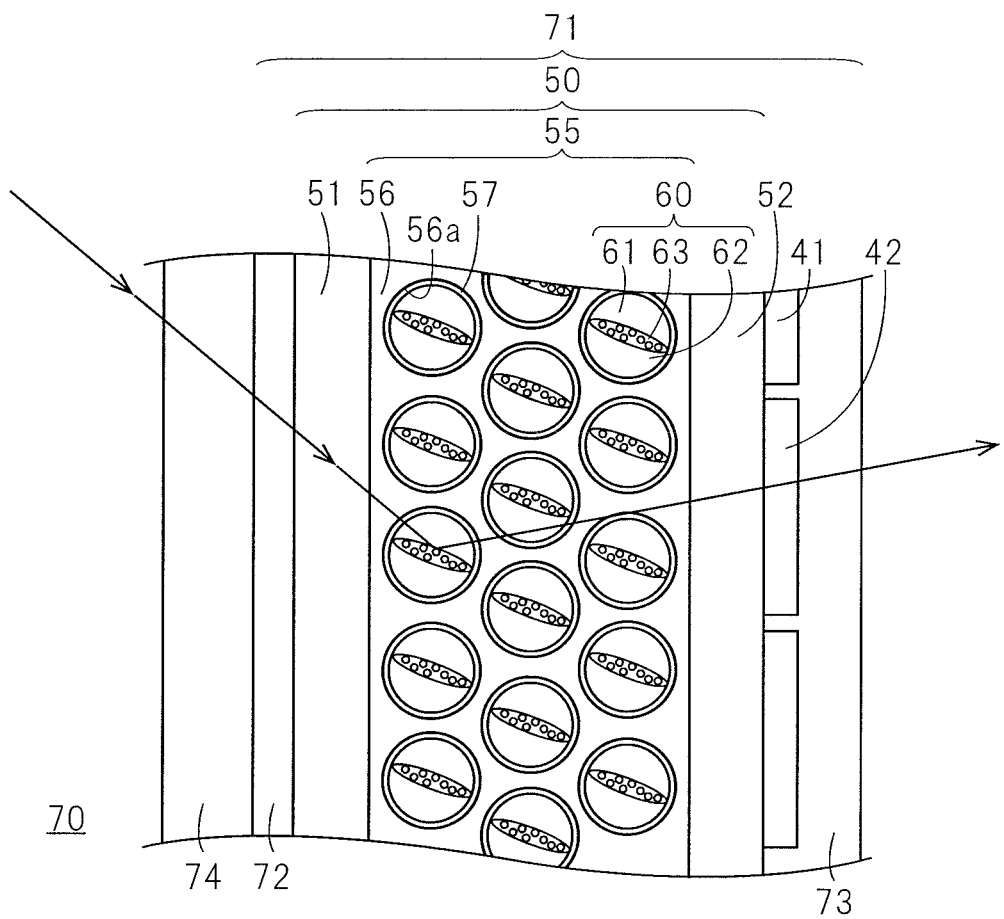
FIG. 25 is a longitudinal sectional view of a light control sheet according to a seventh embodiment.

FIG. 25 is a longitudinal sectional view of a light control sheet 75 according to the seventh embodiment. The light control sheet 75 of FIG. 25 can be used as a lighting sheet to improve lighting efficiency.

The light control sheet 75 of FIG. 25 is provided with a light control layer 71, an adhesive layer 72 disposed at one surface of the light control layer 71, and a protective film 73 disposed at the other surface of the light control layer 71. The light control sheet 75 of FIG. 25 can be layered on a lighting member 74 such as a window with the adhesive layer 72 interposed therebetween. Or the light control sheet 75 according to the present embodiment may be formed integrally inside the lighting member 74 such as a window.

If the adhesive layer 72 is left exposed, the light control sheet 75 is adhered to an unexpected object, so that before adhering the light control sheet 75 to the lighting member 74 such as a window, a peel-off film not shown may be attached to the adhesive layer 72. The peel-off film is peeled off before adhering the light control sheet 75 to the lighting member 74. The protective film 74 is peeled off after the light control sheet 75 is adhered to the lighting member 74. Hereinafter, the peel-off film and the protective film 73 may each be referred to simply as a "layer".

Compositions of the adhesive layer 72 are, for example, one or more kinds of thermoplastic resin from polyvinyl acetal resin, ethylene-vinylacetate copolymer resin, ethylene-acrylate copolymer resin, polyurethane resin, and polyvinyl alcohol resins, which are mixed with an additive such as a plasticizer, an antioxidant, and an ultraviolet ray shielding agent, or formed by mixing an acrylic-resin adhesive, a crosslinking agent, and a diluent.

The light control layer 71 has a pair of base member layers 51 and 52, a particle layer 55 provided between the base member layers, and first and second electrodes 41 and 42 provided at the base member layer 52's side. The particle layer 55 has the same configuration as that of FIG. 20, including a plurality of particles 60. In the same manner as in FIGS. 20 and 24, each particle 60 has a first part 61, a second part 62, and a third part 63. It is also the same as in FIGS. 20 and 24 that the first part 61 and the second part 62 are transparent and the third part 63 has the light scattering or reflecting function.

In the same manner as in the sixth embodiment, the first and second electrodes 41 and 42 are alternately arranged in a stripe pattern. By applying a predetermined voltage between the adjacent first and second electrodes 41 and 42, an electric field can be formed between corresponding the first and second electrodes 41 and 42 in the plane direction of the particle layer 55.

Since no laser light beam is radiated in the seventh embodiment, so that it is not required to make speckles inconspicuous, the voltage to be applied between the first and second electrodes 41 and 42 may be a direct current voltage.

The plane direction of the third part 63 is oriented in a direction oblique to the layered direction of the light control layer 71. Accordingly, when a light beam, which is incident on a surface of the light control layer 71 on the lighting member 74's side, is incident on the third part 63, it is possible that the light beam bounces off obliquely upward. Therefore, when the light control sheet 75 of FIG. 25 is attached to a window extending in the vertical direction, it is possible that external light incident from the window bounces off in a ceiling direction in a room, so that it is possible to illuminate the room brightly in the ceiling direction utilizing natural light.

In order to orient the plane direction of the third part 63 of each particle 60 in the particle layer 55 oblique to the layered direction of the light control layer 71 as shown in FIG. 25, it can be considered to apply a predetermined initial voltage between the adjacent first and second electrodes 41 and 42. In the case where the plane direction of the third part 63 can be oriented oblique to the layered direction of the light control layer 71 by adjusting the specific gravity of the first part 61, the second part 62, and the third part 63 in each particle 60 without voltage application, the electrodes may be omitted. Accordingly, in the present embodiment, the electrodes may not always be necessary components.

However, depending on the season or time zone, if it is desired to adjust the oblique angle of the third part 63 of each particle 60, the first and second electrodes 41 and 42 are necessary components. Depending on the sunlight incidence angle, by adjusting the voltage to be applied to the first and second electrodes 41 and 42, at least one of the functions on antiglare, lighting, and privacy in the room can be achieved.

As described above, in the seventh embodiment, since, the particle layer 55 including the particles 60 each having the first part 61, the second part 62, and the third part 63 is installed in the light control sheet 75. Therefore, the light control sheet 75 excellent in at least one of the antiglare, lighting, and privacy can be realized.

A variety of modifications can be added to the above-described fifth to seventh embodiments. One example of the modification will be explained with reference to the drawings. In the following explanation and the drawings to be used in the following explanation, for the elements to be configured in the same manner as those in the above-described embodiments, the same signs as those used for the corresponding elements in the above-described embodiments are used and the duplicate explanation is omitted.

Figure 26:
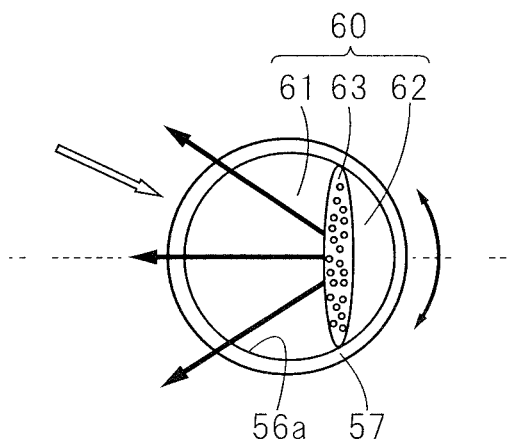
FIG. 26 is an illustration showing an example in which a first part has a larger volume than a third part and a second part is disposed apart from the center of a particle.

In the example described above, the first part 61 and the second part 62 in each particle 60 are almost the same in volume and the third part 63 is disposed at almost the center area of the particle 60. However, the first part 61 and the second part 62 may be different in volume. In FIG. 26, the first part 61 has a larger volume than the second part 62 and the third part 63 is disposed apart from the center of the particle 60. Conversely to FIG. 26, the first part 61 has a smaller volume than the second part 62.

When the particles 60 are produced by the above-described microchannel production method, the first part 61 and the third part 63 may be different in volume depending on the particles 60, so that the particles 60 of FIGS. 20 and 26 may coexist. Even in such a case, the particles 60 rotate in the same manner by means of an alternating current voltage applied to the first and second electrodes, and hence there is no particular practical problem.

In the present embodiment, it is a precondition that the first part 61 is disposed at the observer's side not at the second part 62's side. Therefore, it is desirable for the first part 61 to take in a light beam from the projector 20 with no losses and guide it to the third part 63. To the contrary, the second part 62 may have the light absorbing function. The light absorbing function of the second part 62 can be developed when, as an example, the second part 62 includes a light-absorbing coloring material, specifically, a pigment such as carbon black and titan black. When the second part 62 has the light absorbing function, a light beam Lc, incident from a direction different from the direction of an image light beam La from the projector 20, can be absorbed by the second part 62. The light beam to be absorbed by the third part 63 may, for example, be an ambient light beam from an illumination apparatus 90 (refer to FIG. 1) present in the place where the display apparatus 10 is installed. By selecting and absorbing the light beam Lc except for the image light beam La incident on the screen 40, without loosing the brightness of a displayed image, it is possible to efficiently improve the contrast of the displayed image.

Eighth Embodiment

Figure 27:
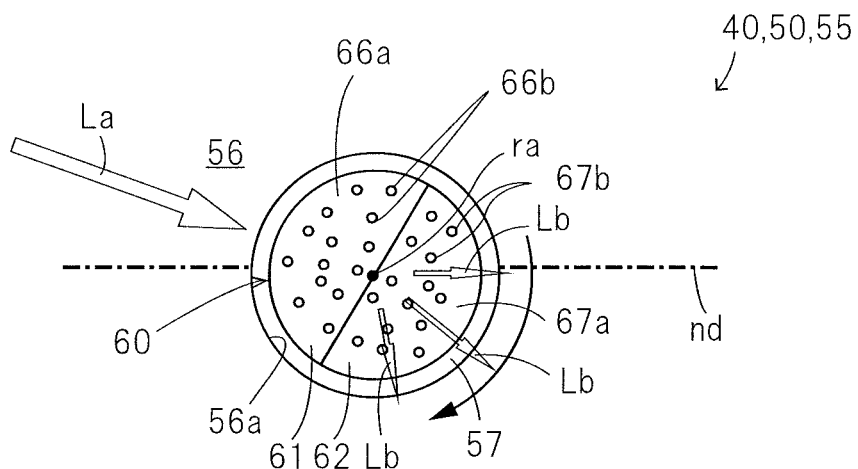
FIG. 27 is an illustration for explaining an operation of a particle of a particle layer according to an eighth embodiment.
Figure 28:
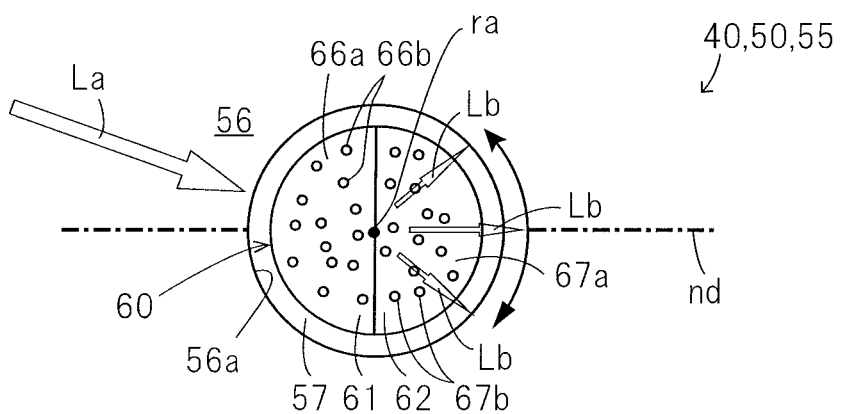
FIG. 28 is an illustration for explaining an operation of the particle of the particle layer according to the eighth embodiment.
Figure 29:
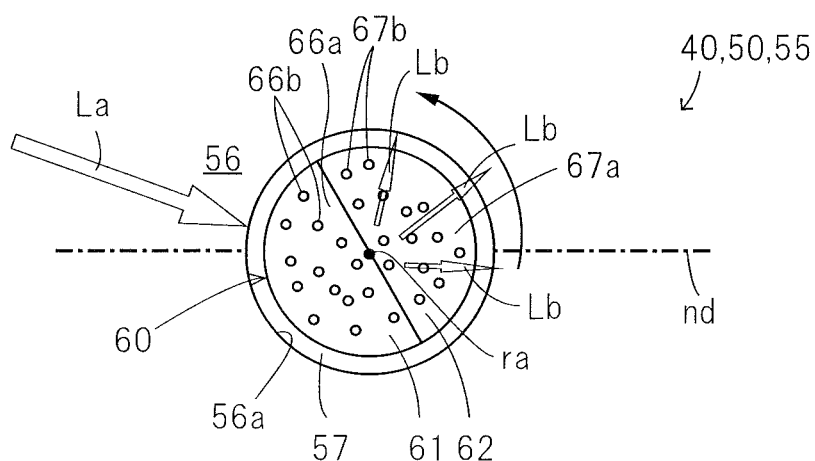
FIG. 29 is an illustration for explaining an operation of the particle of the particle layer according to the eighth embodiment.

A display apparatus 10 according to the eighth embodiment is provided with a transparent-type screen 40. The entire configuration of the display apparatus 10 is, for example, the same as that of FIG. 19. The longitudinal sectional view of the transparent-type screen 40 is, for example, the same as FIG. 2. FIGS. 27 to 29 are illustrations for explaining an operation of the transparent-type screen. A voltage waveform to be applied from the power source 30 to the transparent-type screen 40 is, for example, represented by a graph such as shown in FIG. 7.

A transparent-type display apparatus 10 according to the present embodiment has a projector 20 and a transparent-type screen 40 to be irradiated with an image light beam from the projector 20. As described later, the transparent-type screen 40 is capable of changing with time the diffusion characteristics that affect an incident light beam. Accordingly, speckles become inconspicuous. In relation to such function of the transparent-type screen 40, the transparent-type display apparatus 10 further has a power source 30 and a controller 35. The power source 30 applies a voltage to the transparent-type screen 40. The controller 35 adjusts the applied voltage from the power source 30 to control a mode of the transparent-type screen 40. Moreover, the controller 35 controls an operation of the projector 20. As an example, the controller 35 is a general-purpose computer.

For example as shown in FIG. 3, the projector 20 projects a coherent light beam onto the transparent-type screen 40 so as to scan the entire area of the transparent-type screen 40. Scanning is performed at high speeds. In accordance with an image to be formed, the projector 20 stops emission of the coherent light beam from the coherent light source 21. In other words, the coherent light beam is projected onto only a position on the transparent-type screen 40 at which the image is to be formed. As a result, the image is formed on the transparent-type screen 40. The operation of the projector 20 is controlled by the controller 35.

The transparent-type screen 40 according to the present embodiment has a particle sheet 50 having a plurality of particles, and electrodes 41 and 42 connected to the power source 30. The particle sheet 50 has a pair of base members 51 and 52, and a particle layer 55 disposed between the pair of base members 51 and 52. The particle layer 55 has a large number of particles 60 and a holder 56 for holding the particles 60. The particles 60 have a function of changing the travel direction of an image light beam projected from the projector 20. In the example shown, the particles 60 have a function of diffusing the image light beam, especially, by diffuse transmission.

Each particle 60 includes a first part 61 and a second part 62 different in dielectric constant. When this particle 60 is placed in an electric field, an electron dipole moment is generated in the particle 60. In this occasion, the particle 60 operates in such a manner that a vector of the electron dipole moment is oriented in a complete opposite direction of a vector of the electric field. Therefore, when a voltage is applied between the first electrode 41 and the second electrode 42 so that an electric field is generated in the particle sheet 50 located between the first electrode 41 and the second electrode 42, the particle 60 operates in each cavity 56a in such a manner that the particle 60 takes a stable posture with respect to the electric field, that is, a stable position and orientation with respect to the electric field. The transparent-type screen 40 changes its diffusion characteristics in accordance with the operation of the particles 60 having the light diffusion function. The first part 61 and the second part 62 are transparent. It is preferable that the first part 61 and the second part 62 have the same visible light transmittance as the above-described first electrode 41 and the like.

When producing the particles 60 with the microchannel production method, by adjusting the speed, the joint direction, etc., in the case where the two kinds of polymerizable resin components that constitute the continuous phase are joined to each other, and by adjusting the speed, the discharge direction, etc., in the case where the continuous phase is discharged into the spheroidizing phase, the outer shape of the obtained particles 60, the interface shape between the first part 61 and the second part 62 of each particle 60, etc. can be adjusted. In the example of the particle 60 shown in FIGS. 27 to 29, the volume ratio of the first part 61 and the volume ratio of the second part 62 are the same as each other. Moreover, in the example of the particle 60 shown in FIGS. 27 to 29, the interface between the first part 61 and the second part 62 is formed into a planar shape. And the particle 60 shown in FIGS. 27 to 29 is a sphere. That is, in the particle 60 shown in FIGS. 27 to 29, the first part 61 and the second part 62 are each a hemisphere.

When two kinds of polymerizable resin components that constitute the continuous phase include diffused components, the first part 61 and the second part 62 of the particle 60 can be given an internal diffusion function. In the example shown in FIGS. 27 to 29, the first part 61 of the particle 60 has a first main part 66a and a plurality of first diffused components (diffused particles) 66b diffused in the first main part 66a. In the same manner, the second part 62 has a second main part 67a and a plurality of second diffused components (diffused particles) 67b diffused in the second main part 67a. In other words, the sphere particle 60 shown in FIGS. 27 to 29 is capable of giving a diffusion function to a light beam propagating inside the first part 61 and a light beam propagating inside the second part 62. Here, the diffused components 66b and 67b are components capable of exerting an action to change the travel direction of a light beam travelling inside the particle 60 by reflection, refraction, etc. Such light diffusion function (light scattering function) of the diffused components 66b and 67b is given by, for example, forming the diffused components 66b and 67b by materials having a refractive index different from those of the materials that constitute the main parts 66a and 67a of the particle 60 or by materials capable of exerting a reflection operation to a light beam. As the diffused components 66b and 67b having a refractive index different from those of the materials that constitute the main parts 66a and 67a, resin beads, glass beads, a metal compound, a porous material containing a gas, and mere babbles are listed up as examples. It is preferable that the quantities of the diffused components 66b and 67b added in the particle 60 are adjusted so that transmittance to a light beam incident on the particle 60 is higher than reflectance to the light beam incident on the particle 60.

The particle layer 55, the particle sheet 50, and the transparent-type screen 40 can be produced as described below as an example.

The particle layer 55 can be produced by a production method disclosed in JP1-28259A. That is, first of all, an ink in which the particles 60 are dispersed in polymerizable silicon rubber is prepared. Then, the ink is stretched by a coater or the like and polymerized further by heating or the like to be formed into a sheet. By these steps, the holder 56 that holds the particles 60 is obtained. Subsequently, the holder 56 is dipped into the solvent 57 such as silicon oil for a certain period of time. When the holder 56 swells, a gap filled with the solvent 57 is formed between the holder 56 made of silicon rubber and each particle 60. As a result, the cavities 56a that accommodate the solvent 57 and the particles 60 are defined. As described above, the particle layer 55 can be produced.

Subsequently, by a production method disclosed in JP2011-112792A, the transparent-type screen 40 can be produced using the particle layer 55. First of all, the particle layer 55 is covered with the pair of base members 51 and 52, and sealed by lamination or using an adhesive or the like. In this way, the particle sheet 50 is produced. Subsequently, the first electrode 41 and the second electrode 42 are disposed on the particle sheet 50, and furthermore, the first cover layer 46 and the second cover layer 47 are disposed thereon, and then the Fresnel lens layer 70 is disposed thereon to obtain the transparent-type screen 40.

Subsequently, an operation in displaying an image using this transparent-type display apparatus 10 will be explained.

First of all, under control by the controller 35, the coherent light source 21 of the projector 20 oscillates a coherent light beam. The light beam from the projector 20 is subjected to optical path adjustments by a scanning device not shown and radiated onto the transparent-type screen 40. As shown in FIG. 3, the scanning device not shown adjusts the optical path of the light beam so that the light beam scans the display-side surface 40a of the transparent-type screen 40. Emission of the coherent light beam by the coherent light source 21 is controlled by the controller 35. In accordance with an image to be displayed on the transparent-type screen 40, the controller 35 stops the emission of the coherent light beam from the coherent light source 21. The operation of the scanning device included in the projector 20 is performed at such a high speed that it cannot be resolved by human eyes. Therefore, the observer observes simultaneously light beams radiated at a given time interval on respective points on the transparent-type screen 40.

A light beam projected onto the transparent-type screen 40, after being deflected by the Fresnel lens layer 70 to be an almost parallel light beam, passes through the first cover layer 46 and the first electrode 41, and then reaches the particle sheet 50. The light beam is diffused by the particles 60 of the particle sheet 50 and passes the particles 60, and then is emitted toward several directions in the observer's side of the transparent-type screen 40. Therefore, at respective points in the observer's side of the transparent-type screen 40, transmitted light beams from respective points on the transparent-type screen 40 can be observed. As a result, an image corresponding to an area irradiated with the coherent light beams on the transparent-type screen 40 can be observed.

The coherent light source 21 may include a plurality of light sources that emit coherent light beams of wavelengths different from one another. In the case, the controller 35 controls a light source corresponding to a light beam of each wavelength independently from the other light sources. As a result, it is possible to display a color image on the transparent-type screen 40.

When a coherent light beam is used to form an image on a screen, speckles of a spot pattern are observed. One cause of the speckles is considered that, after a coherent light beam, a typical example of which is a laser beam, is diffused on the screen, the coherent light beam generates an interference pattern on an optical sensor (retinas in the case of human beings). Above all, when a coherent light beam is radiated onto the screen by raster scanning, the coherent light beam is incident on respective points on the screen from a constant incidence direction. Therefore, when the raster scanning is adopted, speckle wavefronts generated on the respective points on the screen are unchanged as long as the screen does not swing, and when the speckle pattern is viewed with an image by the observer, the image quality of a displayed image is drastically degraded.

To the contrary, the transparent-type screen 40 of the transparent-type display apparatus 10 according to the present embodiment changes the diffusion characteristics with time. When the diffusion characteristics of the transparent-type screen 40 change, speckle patterns on the transparent-type screen 40 change with time. When the diffusion characteristics change with time at a sufficiently high speed, the speckle patterns are overlapped one another and averaged to be observed by the observer. Accordingly, speckles become inconspicuous.

The shown transparent-type screen 40 has a pair of electrodes 41 and 42. The pair of electrodes 41 and 42 are electrically connected to the power source 30. The power source 30 is capable of applying a voltage to the pair of electrodes 41 and 42. When the voltage is applied between the pair of electrodes 41 and 42, an electric field is formed in the particle sheet 50 located between the pair of electrodes 41 and 42. The particle layer 55 of the particle sheet 50 holds the particles 60 so as to be operable, each including the first part 61 and the second part 62 different in dielectric constant. Since the particles 60 have been charged or when an electric field is formed in at least the particle layer 55, a dipole moment is generated, and hence the particles 60 operate in accordance with a vector of the formed the electric field. When the particles 60 operate, which have a function of changing a light travel direction such as a diffusion function, as shown in FIGS. 27 to 29, the diffusion characteristics of the transparent-type screen 40 change with time. As a result, speckles become inconspicuous. In FIGS. 27 to 29, a sign "La" is an image light beam radiated from the projector 20 to the transparent-type screen 40 and signs "Lb" are image light beams diffused by the screen 40.

Concerning the difference in dielectric constants between the first part 61 and the second part 62 of each particle 60, it is enough for the dielectric constants to be different to the extent that a speckle reducing function can be exerted.

Therefore, whether the dielectric constants between the first part 61 and the second part 62 of the particle 60 are different from each other can be determined by whether the particle 60 held so as to be operable can operate in accordance with the change in electric field vector.

The operating principle of the particles 60 to the holder 56 is to change the orientation and position of each particle 60 so that the electric charge or dipole moment of the particle 60 has a stable positional relationship with an electric field vector. Therefore, when a constant electric field is continuously applied to the particle layer 55, the operation of the particle 60 stops after a certain period of time. On the other hand, in order to make speckles inconspicuous, it is required that the operation of the particle 60 to the holder 56 continues. Accordingly, the power source 30 applies a voltage so that an electric field formed in the particle layer 55 varies with time. In the example shown, the power source 30 applies a voltage between the pair of electrodes 41 and 42 so as to invert the vector of an electric field generated in the particle sheet 50. For example, in an example shown in FIG. 7, the power source 30 repeatedly applies a voltage X[V] and a voltage −Y[V] to the pair of electrodes 41 and 42. Together with such application of an inverted electric field, as an example, the particle 60 can repeatedly operate between the states of FIGS. 29 and 27 with the state of FIG. 28 as a center state. The voltage to be applied to the first and second electrodes 41 and 42 may not be limited to that shown in FIG. 7, which may, for example, be an alternating current voltage or the like.

The particles 60 are accommodated in the cavities 56a formed in the holder 56. In the example shown in FIGS. 27 to 29, each particle 60 has an almost sphere outer shape. Each cavity 56a that accommodates the particle 60 has an almost sphere inner shape. Therefore, the particle 60 can perform rotational vibration having a rotation axis line ra, as a center, which extends in a direction perpendicular to the drawing sheets of FIGS. 27 to 29. Depending on the size of the cavity 56a that accommodates the particle 60, the particle 60 performs, not only the repeated rotational vibration, but also translational motion. The cavity 56a is filled with the solvent 57. The solvent 57 makes smooth the operation of the particle 60 to the holder 56.

In the present embodiment described above, the transparent-type screen 40 has the particle layer 55 that has the particles 60 each including the transparent first part 61 and the transparent second part 62 different in dielectric constant and the plurality of diffused components 66b and 67b diffused in the first part 61 and the second part 67b, and has the electrodes 41 and 42 that form an electric field for driving the particles 60 of the particle layer 55, by being applied with a voltage. In the transparent-type screen 40, when a voltage is applied between the first electrode 41 and the second electrode 42, an electric field is formed in the particle layer 55. In this occasion, the particles 60 operate in accordance with the formed electric field. When the particles 60 operate, which have a function of changing a light travel direction such as a diffusion function, the diffusion characteristics of the transparent-type screen 40 change with time. Therefore, while a light beam is being radiated onto the transparent-type screen 40, by forming the electric field in the particle layer 55 to operate the particles 60, it is possible to efficiently make the speckles inconspicuous. It is relatively easy to produce such transparent-type screen 40, for example, using the above-described production method. In addition, the transparent-type screen 40 is suitable for a large screen and excellent in durability and operational stability, and furthermore, easily-controllable.

Moreover, according to the present embodiment, the first part 61 and the second part 62 different in dielectric constant are formed to be transparent. Therefore, even though the orientations, postures, and positions of the particles 60 change, the color of the transparent-type screen 40 does not change. Accordingly, when displaying an image, it is not perceived that the tone of the transparent-type screen 40 is changed. As a result, it is also possible to efficiently avoid image quality degradation in accordance with color change in the transparent-type screen 40. The particles 60 operable in an electric field and being transparent can be produced by forming the first part 61 and the second part 62 from synthetic resins of the same kind and by mixing a chargeable additive into one of the first part 61 and the second part 62. Accordingly, this useful particles 60 for the transparent-type screen 40 can be easily produced.

Furthermore, according to the present embodiment, while a light beam is being radiated onto the transparent-type screen 40, the particles 60 can be repeatedly rotated in the particle layer 55. In other words, the particles 60 can operate to effectively change the diffusion characteristics in an extremely small space. Therefore, by repeatedly rotating the particles 60, while realizing a thin particle layer 55 and a thin screen 40, speckles can effectively be made inconspicuous.

As explained in the above-described embodiment, by varying the application voltage to the pair of electrodes 41 and 42, the particles 60 can be operated. And, by adjusting the variation range, center voltage, etc. of the application voltage, it is possible to control the operation range of the particles 60 and the postures of the particles 60 at the center of the operation range.

To the above-described embodiment, it is possible to make a variety of changes. Hereinafter, with reference to the drawings, an example of modification will be explained. In the following explanation and the drawings to be used in the following explanation, the same signs as those to the corresponding elements in the above-described embodiment are used and the duplicate explanation is omitted.

The first part 61 and the second part 62 of each particle 60 may be different in volume ratio. In other words, the volume ratio of the first part 61 that occupies the particle 60 and the volume ratio of the second part 62 that occupies the particle 60 may be different from each other.

Ninth Embodiment

Figure 30:
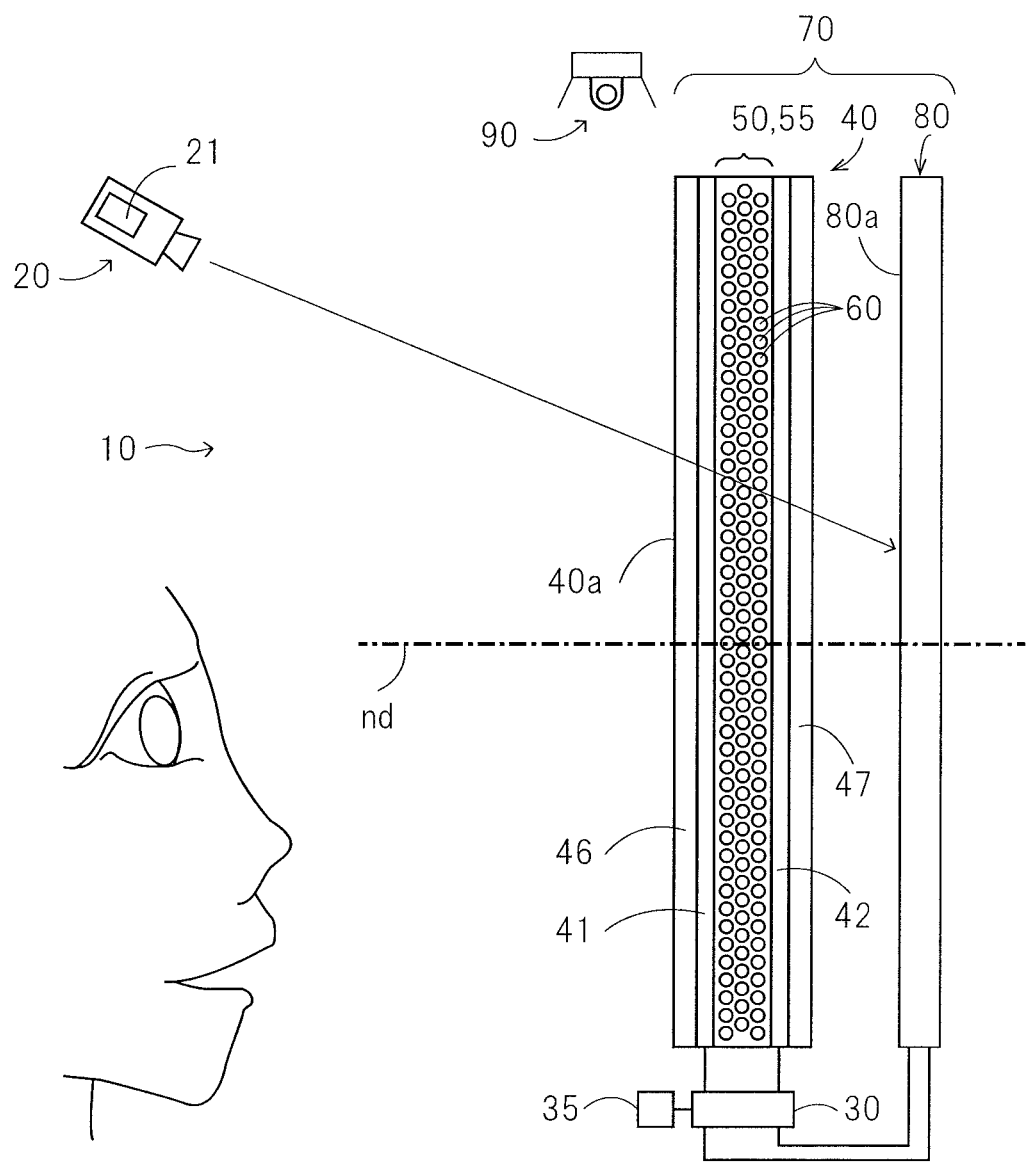
FIG. 30 is an illustration for explaining a ninth embodiment and is a sectional view showing a display apparatus.
Figure 31:
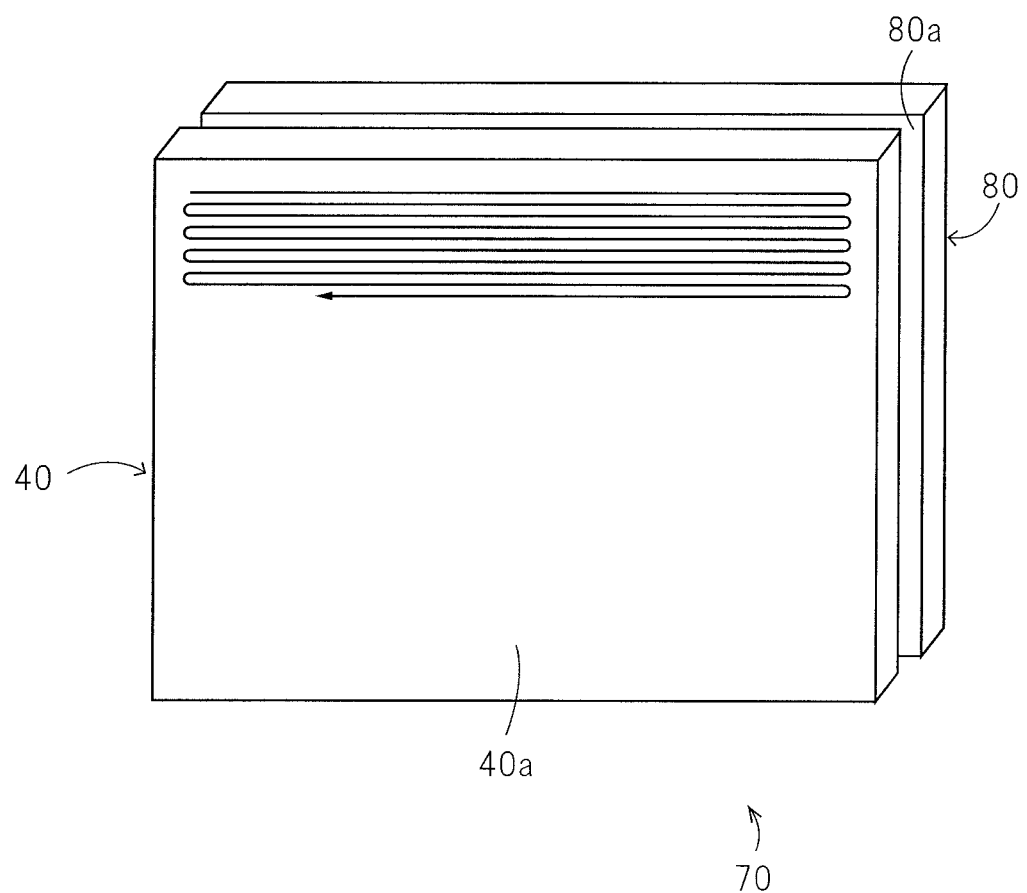
FIG. 31 is a perspective view showing a solar cell-equipped screen and is an illustration showing a method of radiating an image light beam from a projector of a display apparatus to the screen.

FIGS. 30 to 33 are illustrations for explaining a ninth embodiment of the present disclosure. FIG. 30 is an illustration showing a display apparatus according to the present embodiment. FIG. 31 is an illustration for explaining an irradiation method of an image light beam onto the screen.

As shown in FIGS. 30 and 31, a display apparatus 10 is provided with a projector 20 and a solar cell-equipped screen (photoelectric conversion panel-equipped screen) 70. The solar cell-equipped screen 70 has a screen 40 with a display-side surface 40a to be irradiated with an image light beam from the projector 20 to display an image, and a solar cell panel (photoelectric conversion panel) 80. As described later, the screen 40 is capable of changing with time the diffusion characteristics that affect an incident light beam. In this way, speckles become inconspicuous. The solar cell panel 80 is disposed at the opposite side of the screen 40 to the display-side surface 40a, to be irradiated with a light beam that has passed through the screen 40. In relation to such functions of the screen 40 and the solar cell panel 80, the solar cell-equipped screen 70 further has a power supply device 30 and a controller 35. The power supply device 30 generates an application voltage based on power generated by the solar cell panel 80 and applies the application voltage to the screen 40. The power supply device 30 may, for example, be a DC-AC converter to convert the power generated by the solar cell panel 80 into an alternating current application voltage. The controller 35 controls the application voltage to control the mode of the screen 40.

The screen 40 according to the present embodiment has a particle sheet 50 having a plurality of particles, and electrodes 41 and 42 connected to the power source 30. The first electrode 41 is spread in a planar shape over one main surface of the particle sheet 50. The second electrode 42 is spread in a planar shape over the other main surface of the particle sheet 50. Moreover, the shown screen 40 has a first cover layer 46 that covers the first electrode 41 to form one outermost surface of the screen 40 and a second cover layer 47 that covers the second electrode 42 to form the other outermost surface of the screen 40.

In the example shown, the screen 40 is a reflection-type screen. The projector 20 radiates an image light beam onto a display-side surface 40a made up of the first cover layer 46. The image light beam passes through the first cover layer 46 and the first electrode 41 of the screen 40 and, thereafter, is reflected on the particle sheet 50 by diffuse reflection. As a result, an observer situated to face the display-side surface 40a of the screen 40 can observe an image.

The particle sheet 50 has a pair of base members 51 and 52, and a particle layer 55 disposed between the pair of base members 51 and 52. The particle layer 55 has a large number of particles 60 and a holder 56 for holding the particles 60. Each particle 60 includes, for example, as shown in FIGS. 4 to 6, a first part 61 and a second part 62 different in dielectric constant. Therefore, when this particle 60 is placed in an electric field, an electron dipole moment is generated in the particle 60. In this case, the particle 60 operates in such a manner that a vector of the electron dipole moment is oriented in a complete opposite direction of a vector of the electric field. Therefore, when a voltage is applied between the first electrode 41 and the second electrode 42, so that an electric field is generated in the particle sheet 50 located between the first electrode 41 and the second electrode 42, the particle 60 operates in each cavity 56a in such a manner that the particle 60 takes a stable posture with respect to the electric field, that is, a stable position and orientation with respect to the electric field. The screen 40 changes its diffusion characteristics in accordance with the operation of the particles 60 having a light diffusion function.

Subsequently, the solar cell panel 80 will be explained. The solar cell panel 80 is a power generator to convert light received at a light receiving surface 80a into electrical energy. The light receiving surface 80a of the solar cell panel 80 may have an almost same area as the area of an incidence-side surface 40a of the screen 40. Moreover, it is preferable that the solar cell panel 80 is disposed at a position at which most part of a light beam that has passed through the screen 40 is incident on the light receiving surface 80a. Because of these factors, power generation efficiency can be enhanced. The solar cell panel 80 can take a variety of types of configuration. For example, a silicon-based solar cell including a flat silicon substrate made of monocrystalline silicon, poly monocrystalline silicon, etc., a dye-sensitized solar cell, a thin-film solar cell, a chalcopyrite-based solar cell, etc. can be used as the solar cell panel 80. It is preferable that conversion efficiency of the solar cell panel 80 is maximum in a wavelength band of the light beam from the projector 20.

Subsequently, an operation in displaying an image using this display apparatus 10 will be explained. The screen 40 of the display apparatus 10 according to the present embodiment changes the diffusion characteristics with time. When the diffusion characteristics of the transparent-type screen 40 change, speckle patterns on the transparent-type screen 40 change with time. When the diffusion characteristics change with time at a sufficiently high speed, the speckle patterns are overlapped one another and averaged to be observed by the observer. As a result, speckles become inconspicuous.

The shown screen 40 has a pair of electrodes 41 and 42. The pair of electrodes 41 and 42 are electrically connected to the power supply device 30. The power source 30 is capable of applying a voltage between the pair of electrodes 41 and 42 based on power generated by the solar cell panel 80. When the voltage is applied to the pair of electrodes 41 and 42, an electric field is formed in the particle sheet 50 located between the pair of electrodes 41 and 42. The particle layer 55 of the particle sheet 50 holds the particles 60 so as to be operable, each including the first part 61 and the second part 62 different in dielectric constant. Since the particles 60 have been charged or when an electric field is formed in at least the particle layer 55, a dipole moment is generated, and hence the particles 60 operate in accordance with a vector of the formed the electric field. When the particles 60 operate, which have a function of changing a light travel direction, such as, a reflection function and a diffusion function, as shown in FIGS. 4 to 6, the diffusion characteristics of the screen 40 change with time. As a result, speckles become inconspicuous. In FIGS. 4 to 6, and FIGS. 10 and 12 which will be referred to later, a sign "La" is an image light beam radiated from the projector 20 to the screen 40 and signs "Lb" are image light beams diffused by the screen 40.

Concerning the difference in dielectric constants between the first part 61 and the second part 62 of each particle 60, it is enough for the dielectric constants to be different to the extent that a speckle reducing function can be exerted. Therefore, whether the dielectric constants between the first part 61 and the second part 62 of the particle 60 are different from each other can be determined by whether the particle 60 held so as to be operable can operate in accordance with the change in electric field vector.

The operating principle of the particles 60 to the holder 56 is to change the orientation and position of each particle 60 so that the electric charge or dipole moment of the particle has a stable positional relationship with an electric field vector. Therefore, when a constant electric field is continuously applied to the particle layer 55, the operation of the particle 60 stops after a certain period of time. On the other hand, in order to make speckles inconspicuous, it is required that the operation of the particle 60 to the holder 56 continues. Accordingly, the power supply device 30 applies a voltage so that an electric field formed in the particle layer 55 varies with time. In other words, the controller 35 controls the application voltage so as to operate the particles in the particle layer 55. In the example shown, the power supply device 30 applies a voltage between the pair of electrodes 41 and 42 so as to invert the vector of an electric field generated in the particle sheet 50. For example, in the example shown in FIG. 7, the power source 30 repeatedly applies a voltage X[V] and a voltage −Y[V] to the pair of electrodes 41 and 42. Together with such application of an inverted electric field, as an example, the particle 60 can repeatedly operate between the states of FIGS. 4 and 6 with the state of FIG. 5 as a center state. The voltage to be applied to the first and second electrodes 41 and 42 may not to be limited to that shown in FIG. 7, which may, for example, be an alternating current voltage or the like.

The particles 60 are accommodated in the cavities 56*a* formed in the holder 56. In the example shown in FIGS. 4 to 6, each particle 60 has an almost sphere outer shape. Each cavity 56*a* that accommodates the particle 60 has an almost sphere inner shape. Therefore, the particle 60 can perform rotational vibration having a rotation axis line ra, as a center, which extends in a direction perpendicular to the drawing sheets of FIGS. 4 to 6. Depending on the size of the cavity 56*a* that accommodates the particle 60, the particle 60 performs, not only the repeated rotary motion, but also translational motion. The cavity 56*a* is filled with the solvent 57. The solvent 57 makes smooth the operation of the particle 60 to the holder 56.

In the present embodiment described above, the screen 40 has the particle layer 55 that has the particles 60 each including the first part 61 and the second part 62 different in dielectric constant, and has the electrodes 41 and 42 that form an electric field for driving the particles 60 of the particle layer 55, by being applied with the power generated by the solar cell panel 80. In the screen 40, when a voltage is applied between the first electrode 41 and the second electrode 42, an electric field is formed in the particle layer 55. In this occasion, the particles 60 operate in accordance with the formed electric field. When the particles 60 operate, which have a function of changing a light travel direction, such as, a reflection function and a diffusion function, the diffusion characteristics of the screen 40 change with time. Therefore, while a light beam is being radiated onto the screen 40, by forming the electric field in the particle layer 55 to operate the particles 60, it is possible to efficiently make the speckles inconspicuous. It is relatively easy to produce such screen 40, for example, using the above-described production method. In addition, the screen 40 is suitable for a large screen and excellent in durability and operational stability, and furthermore, easily-controllable.

Moreover, according to the present embodiment, since the solar cell-equipped screen 70 is provided with the solar cell panel 80, it can be omitted to secure a separate power supply (commercial power supply or the like) for driving the particles 60 of the particle layer 55 and to install wiring for power supply from the separate power supply to the screen 40. Furthermore, since a light beam from the projector 20 is used for power generation, it is not required to radiate a separate illumination light beam for power generation or the like to the solar cell panel 80. Such solar cell-equipped screen 70 has high flexibility in selection of installation place and hence applicable in a variety of usage. That is, the solar cell-equipped screen 70 can be installed in a place where it is difficult to secure a power supply, install wiring, etc., and a place where it is difficult to secure an illumination light beam for power generation.

Moreover, according to the present embodiment, each particle 60 including the first part 61 and the second part 62 different in dielectric constant is formed to have a monochrome color. Therefore, even though the orientation, posture, and position of the particle 60 changes, the screen 40 has a constant color. Accordingly, when displaying an image, it is not perceived that the tone of the screen 40 is changed. As a result, it is also possible to efficiently avoid image quality degradation in accordance with color change in the screen 40. The particles 60 operable in an electric field and having a monochrome color can be produced by forming the first part 61 and the second part 62 from synthetic resins of the same kind and by mixing a chargeable additive into one of the first part 61 and the second part 62. Accordingly, such useful particles 60 for the screen 40 can be easily produced.

Furthermore, according to the present embodiment, while a light beam is being radiated onto the screen 40, the particles 60 can be repeatedly rotated in the particle layer 55. In other words, the particles 60 can operate to effectively change the diffusion characteristics in an extremely small space. Therefore, by repeatedly rotating the particles 60, while realizing a thin particle layer 55 and a thin screen 40, speckles can effectively be made inconspicuous. When repeatedly rotating each particle 60, its angular range is preferably less than 180° as shown in FIGS. 4 to 6. In this case, either of the first part 61 and the second part 62 can mainly be situated on the observer's side. In other words, while a light beam is being radiated onto the screen 40, it is possible that the first part 61 covers at least part of the second part 62 when viewed from the observer's side along the direction of normal nd to the screen 40. Accordingly, even if the first part 61 and the second part 62 do not have exactly the same color, during image display while operating the particles 60, it is possible that change in tone of the screen 40 is hardly perceived.

As explained in the above-described embodiment, by varying the application voltage to the pair of electrodes 41 and 42, the particles 60 can be operated. And, by adjusting the variation range, center voltage, etc. of the application voltage, it is possible to control the operation range of the particles 60 and the postures of the particles 60 at the center of the operation range.

To the above-described embodiment, it is possible to make a variety of changes. Hereinafter, with reference to the drawings, an example of modification will be explained. In the following explanation and the drawings to be used in the following explanation, the same signs as those to the corresponding elements in the above-described embodiment are used and the duplicate explanation is omitted.

The light beam from the projector 20 may include a visible light beam and an invisible light beam. The invisible light beam may include at least either of an infrared light beam and an ultraviolet light beam. In this case, the conversion efficiency of the solar cell panel 80 may be maximum in a wavelength band of the invisible light beam. Accordingly, since the solar cell panel 80 can generate power with an invisible light beam, in addition to a visible light beam to be used for image display, large power can be generated. The range of choice can be enlarged for the solar cell panel 80.

Figure 32:
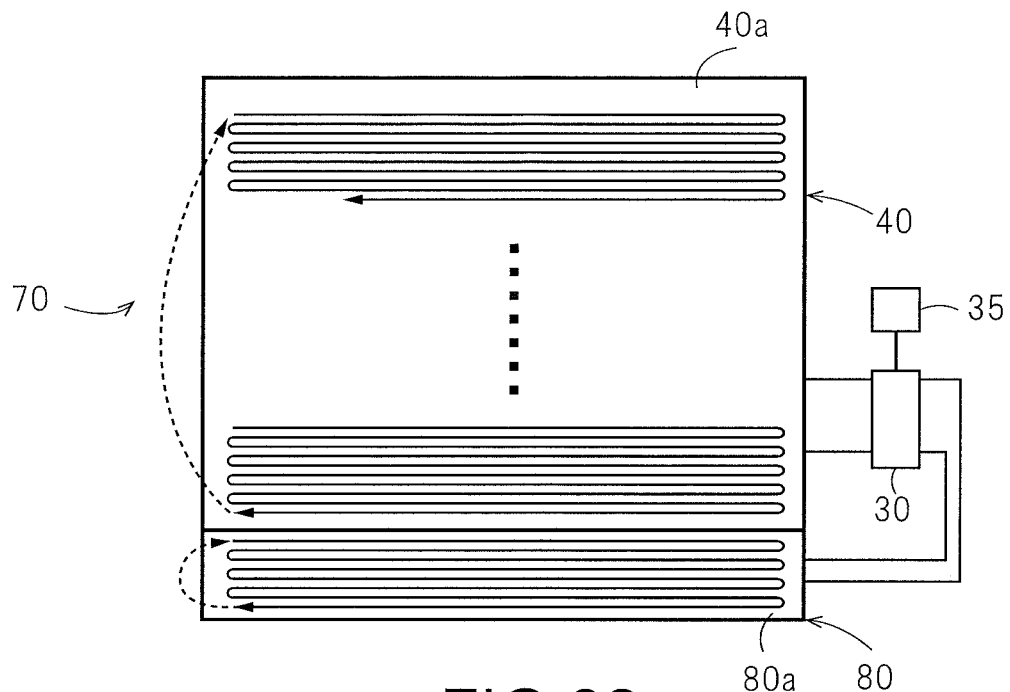
FIG. 32 is a plan view showing a modification of the solar cell-equipped screen and is an illustration showing a method of radiating a light beam from a projector of a display apparatus to the screen.
Figure 33:
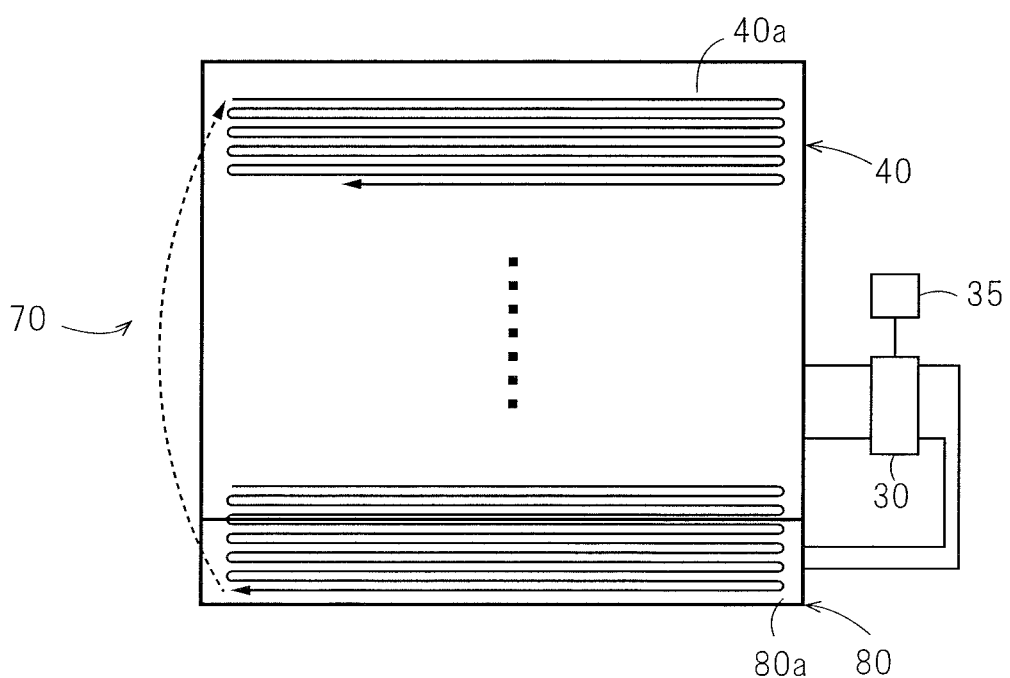
FIG. 33 is a plan view showing a modification of the solar cell-equipped screen and is an illustration showing another example of the method of radiating a light beam from a projector of a display apparatus to the screen.

Moreover, the position at which the solar cell panel 80 is disposed is not to be limited to that in the above-described example, which may be a position that does not overlap with the screen 40 when viewed from the position of the projector 20. That is, for example, as shown in FIGS. 32 and 33, the solar cell panel 80 may be aligned with the screen 40 in the plane direction of the screen 40, so as to be irradiated with a light beam directly from the projector 20. There is no particular limitation on the actual position at which the solar cell panel 80 is disposed, the shape of the solar cell panel 80, etc. The solar cell panel 80 may be disposed above, below, at the side of the screen 40, etc., when viewed from the observer, disposed above, at the side of the screen 40, etc., in a shape of "L", or disposed to surround the display-side surface 40*a* of the screen 40. There is no particular limitation on the area of the light receiving surface 80*a* of the solar cell panel 80. However, since it is enough to generate relatively small power as described above, it is preferable that the area of the light receiving surface 80*a* of the solar cell panel 80 is smaller than the area of the display-side surface 40*a* of the screen 40.

As shown in FIG. 32, the projector 20 may radiate a first light beam formed with a laser light beam to the screen 40, and simultaneously with this, may radiate a second light beam, which is in a wavelength band different from the wavelength band of the first light beam, to the solar cell panel 80. The first light beam includes a visible light beam. The second light beam includes at least either of a visible light beam and an invisible light beam. In other words, the projector 20 may include a light source for emitting the first light beam and a light source for emitting the second light beam, to repeatedly scan the entire area of the screen 40 with the first light beam and repeatedly scan the entire area of the solar cell panel 80 with the second light beam. A raster scanning projector 20 is capable of accurately scanning the entire area of the solar cell panel 80 with the second light beam, with a small loss of the second light beam. With this kind of configuration, while the first light beam is scanning the display-side surface 40*a* of the screen 40, the solar cell panel 80 can continuously supply power to the screen 40. It is preferable that the conversion efficiency of the solar cell panel 80 is maximum in the wavelength band of the second light beam with which the solar cell panel 80 is irradiated. In this way, power generation can be performed efficiently.

The projector 20 may continuously radiate the second light beam onto a predetermined area of the solar cell panel 80, with no scanning of the second light beam. In this way, the configuration of the projector 20 can be simplified. The second light beam may be or may not be formed with the laser light beam.

Moreover, as shown in FIG. 33, the projector 20 may alternately radiate a light beam formed with the laser light beam onto the screen 40 and the solar cell panel 80. Specifically, the projector 20 projects a coherent light beam to repeatedly perform an operation of scanning the entire area of the solar cell panel 80, after scanning the entire area of the screen 40. In this case, the power supply device 30 is provided with a charging function of charging power generated by the solar cell panel 80. Accordingly, while the screen 40 is being scanned, even if the solar cell panel 80 does not generate power, the power supply device 30 can supply the power charged in the previous power generation to the electrodes 41 and 42. The coherent light beam may include a visible light beam only or include a visible light beam and also an invisible light beam. Furthermore, the scanning direction is not to be limited to that in the shown example, which may, for example, be a direction intersecting with the scanning direction of FIG. 33.

In the examples of FIGS. 32 and 33, the second electrode 42 may not be transparent. Therefore, the second electrode 42 can, for example, be formed with a metal thin film of aluminum, copper, etc. The second electrode 42 made of the metal film can also function as a reflective layer to reflect an image light beam in the reflect-type screen 40.

In the example shown in the above-described embodiment, the screen 40 is configured to be a reflective-type screen. However, not to be limited to this example, in the case where the solar cell panel 80 shown in FIGS. 32 and 33 is aligned with the screen 40, the screen 40 may be configured to be a transparent-type screen. In the transparent-type screen 40, it is preferable that the second electrode 42, the second cover layer 47, and the second base member 52 may be configured to be transparent in the same manner as the first electrode 41, the first cover layer 46, and the first base member 51, and have the same visible light transmittance as that of the above-described first electrode 41, first cover layer 46, and first base member 51, respectively. Furthermore, it is preferable that the quantities of the diffused components 66*b* and 67*b* to be added in each particle 60 are adjusted so that transmittance to a light beam incident on the particle 60 becomes higher than reflectance to the light beam incident on the particle 60.

When the particles 60 are produced by the above-described microchannel production method, the first part 61 and the second part 62 may have different volume ratios depending on the particles 60, so that the particles 60 of different volume ratios may coexist. Even in such a case, the particles 60 rotate in the same manner by means of an alternating current voltage applied to the first and second electrodes, and hence there is no particular practical problem.

In the example shown in the above-described embodiment, a positively charged monomer and a negatively charged monomer are used in synthetic resin polymerization to produce charged particles 60 of a monochrome color. Not to be limited to this example, particles 60 having a plurality of parts of different charging characteristics in the solvent 57 are composed by a variety of methods using conventional materials. For example, the particles 60 may be produced by forming a layered structure of two plate-like bodies of materials of different performances and crushing the layered structure into a desired size. Materials having the charging characteristics may be produced by, for example, adding a charge control agent to synthetic resin. As an example of a charge additive, an ionic conduction additive that is a compound of a polymer having polyalkylene glycol used for a static electricity inhibitor, as a main component, and lithium perchlorate or the like can be adopted.

Furthermore, in the above-described embodiment, the particles 60 are spheres in the example shown. Not to be limited to this example, the particles 60 may have an outer shape of rotary ellipsoid, cube, rectangular parallelepiped, conic solid, cylinder, etc. According to the particles 60 of outer shapes other than the sphere, by operating the particles 60, change in diffusion characteristics of the screen 40 with time can be brought about, not by the inter diffusion function of the particles 60, but by the surface reflection of the particles 60.

Moreover, the particle sheet 50, the particle layer 55, and the particles 60 may be produced by methods different from the production methods explained in the above-described embodiments. Furthermore, as long as the particles 60 are held by the holder 56 so as to be operable, the solvent 57 may not be provided.

In the above-described embodiments, one example of layered structure of the screen 40 is shown. However, not to be limited to the example, another function layer to be expected to exert a specific function may be provided to the screen 40. One function layer may be configured to exert two or more functions. For example, the first cover layer 46, the second cover layer 47, the first base member 51, the second base member 52, etc. may work as the function layer. As the function to be given to the function layer, an antireflection (AR) function, a hardcoating (HC) function having excoriation resistance, an ultraviolet ray shielding (reflection) function, an anti-contamination function, etc. can be listed up as examples.

In the example explained in the above-described embodiment, the projector 20 projects a light beam onto the screen 40 in the raster scanning mode. However, not to be limited to the example, the projector 20 may, for example, project an image light beam onto the entire area of the screen 40 at each moment in a mode other than the raster scanning mode. Speckles are generated even when such a projector 20 is used. However, using the above-described screen 20, diffusion front on the screen 40 changes with time to make speckles inconspicuous efficiently. Moreover, the above-described screen 20 can be used in combination with the projector disclosed in International Publication 2012/033174 explained in BACKGROUND ART, that is, a projector capable of changing the incidence angle of an image light beam on each position on the screen with time. According to this projector, speckles can effectively be reduced, however, when this projector and the above-described screen are combined, speckles become inconspicuous more effectively.

Figure 34:
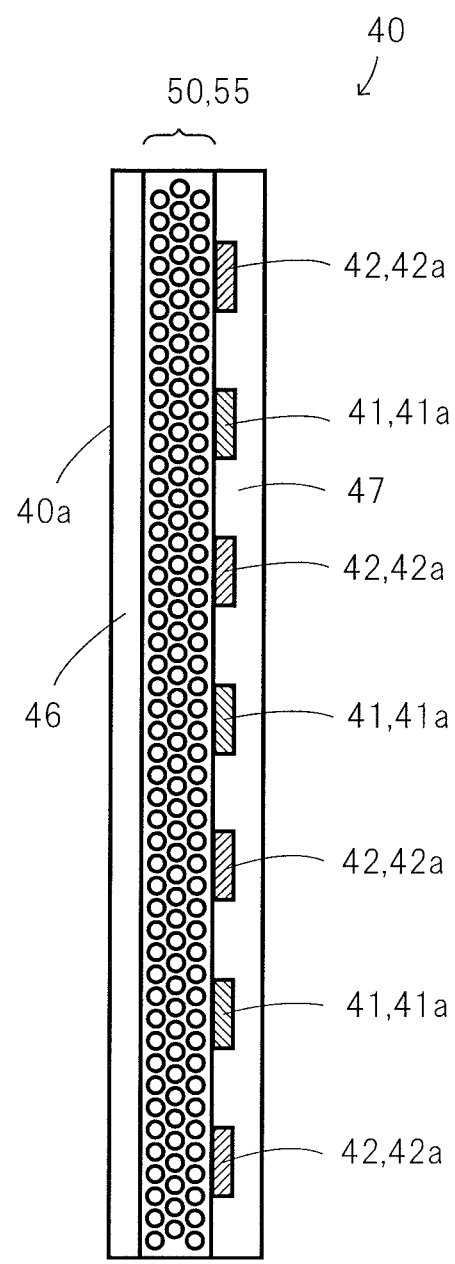
FIG. 34 is an illustration showing a modification of electrodes of a screen.

Furthermore, in the example shown in each above-described embodiment, the first electrode 41 and the second electrode 42 are formed in a planar shape and arranged to sandwich the particle layer 55. Not to be limited to this example, one or more of the first electrode 41 and the second electrode 42 may be formed into a stripe pattern. For example, in the example of FIG. 34, both of the first electrode 41 and the second electrode 42 are formed into a stripe pattern. In other words, the first electrode 41 has a plurality of linear electrode parts 41a extending in a straight line, the plurality of linear electrode parts 41a being arranged in a direction perpendicular to its longitudinal direction. Like the first electrode 41, the second electrode 42 has a plurality of linear electrode parts 42a extending in a straight line, the plurality of linear electrode parts 42a being arranged in a direction perpendicular to its longitudinal direction. In the example shown in FIG. 34, the plurality of linear electrode parts 41a that constitute the first electrode 41 and the plurality of linear electrode parts 42a that constitute the second electrode 42 are both arranged on a surface of the particle sheet 50 opposite to the observer's side surface thereof. Moreover, the plurality of linear electrode parts 41a that constitute the first electrode 41 and the plurality of linear electrode parts 42a that constitute the second electrode 42 are alternately arranged along the same arrangement direction. Also with the first electrode 41 and the second electrode 42 shown in FIG. 34, by applying a voltage from the power source 30, an electric field can be formed in the particle layer 55 of the particle sheet 50.

Several modifications to the respective embodiments described above have been explained, however, it is a matter of course that a plurality of the modifications can be combined to be applied.

The invention claimed is:

1. A display apparatus comprising:
a projector which emits a coherent light beam; and
a screen which displays an image by being irradiated with a light beam from the projector, wherein
the screen comprises;
a light diffusion sheet; and
electrodes which form an electric field in accordance with a voltage applied to a particle layer of the light diffusion sheet, the electric field driving the plurality of particles, wherein,
the light diffusion sheet comprises:
a plurality of particles which comprise a first part and a second part, the first part and the second part being held so as to be operable, wherein
the first part and the second part in at least one of the particles comprise a base material comprising resin and a plurality of diffused components dispersed in the base material, and
light intensity distribution on a measuring surface changes with time in accordance with operation of the particles, wherein
the display apparatus further comprises;
a power source which applies a voltage to the electrodes of the screen; and
a controller which controls an application voltage from the power source to the electrodes,
wherein the controller controls at least orientations or positions of the particles by the application voltage of the power source so that the first part covers at least part of the second part from an observer's side along a direction normal to the screen.

2. The display apparatus of claim 1,
wherein the controller controls the application voltage of the power source so as to operate the particles in the particle layer.

3. The display apparatus of claim 1, wherein the controller controls the application voltage so as to repeatedly rotate the particles within an angular range less than 180°.

4. The display apparatus of claim 1, wherein the diffused components comprise at least one of resin beads, glass beads, a metal compound, a porous material containing a gas, and bubbles.

5. The display apparatus of claim 1, wherein dielectric constants of the first part and the second part of the particles are different from each other.

6. The display apparatus of claim 1, wherein the particles have a monochrome color.

7. The display apparatus of claim 1, wherein either of the first part or the second part of the particles is transparent.

8. The display apparatus of claim 1, wherein a volume ratio of the first part of the particles is larger than a volume ratio of the second part of the particles.

* * * * *